United States Patent
Ito et al.

(10) Patent No.: US 9,285,579 B2
(45) Date of Patent: Mar. 15, 2016

(54) LIGHT MODULATING DEVICE AND LASER PROCESSING DEVICE

(75) Inventors: Haruyasu Ito, Hamamatsu (JP); Takashi Inoue, Hamamatsu (JP); Naoya Matsumoto, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 432 days.

(21) Appl. No.: 13/131,186
(22) PCT Filed: Nov. 26, 2009
(86) PCT No.: PCT/JP2009/069946
§ 371 (c)(1),
(2), (4) Date: Jul. 15, 2011
(87) PCT Pub. No.: WO2010/061884
PCT Pub. Date: Jun. 3, 2010

(65) Prior Publication Data
US 2011/0267679 A1 Nov. 3, 2011

(30) Foreign Application Priority Data
Nov. 28, 2008 (JP) .................. 2008-304738
Nov. 28, 2008 (JP) .................. 2008-304748

(51) Int. Cl.
*G02B 26/00* (2006.01)
*G02B 26/08* (2006.01)
(Continued)

(52) U.S. Cl.
CPC .......... *G02B 26/0833* (2013.01); *G02B 5/285* (2013.01); *G03B 15/02* (2013.01);
(Continued)

(58) Field of Classification Search
CPC .......... G02B 26/001; G02B 26/0841; G02B 26/0833; G02B 5/285; G02F 1/0123; B23K 26/0656; B23K 26/0639

USPC .......... 359/237, 239, 290, 291; 219/121.73, 219/121.6
See application file for complete search history.

(56) References Cited

U.S. PATENT DOCUMENTS

| | | | |
|---|---|---|---|
| 6,734,889 B2 * | 5/2004 | Ramanujan et al. .......... 347/239 |
| 2009/0185154 A1 * | 7/2009 | Tanitsu .......................... 355/68 |

FOREIGN PATENT DOCUMENTS

| JP | H4-251686 | 9/1992 |
|---|---|---|
| JP | 2004-098691 | 4/2004 |

(Continued)

OTHER PUBLICATIONS

English translation of JP 2006-035775, translated on Feb. 12, 2013.*
(Continued)

*Primary Examiner* — Thomas K Pham
*Assistant Examiner* — Jie Lei
(74) *Attorney, Agent, or Firm* — Drinker Biddle & Reath LLP

(57) ABSTRACT

A light modulating device (101A) comprises a reflective SLM (107) for modulating a laser beam (Lr) entering along a first optical path extending in a first direction; a dielectric multilayer film mirror (106), formed on a light transmitting member (105) transparent to illumination light (Li), for reflecting the laser beam (Lr) incident on a front face thereof from the reflective SLM (107) onto a second optical path extending in a second direction intersecting the first direction, and transmitting the illumination light (Li) incident on a rear face thereof onto the second optical path; and a light collecting lens (109) for receiving the illumination light (Li) and laser beam (Lr) from the dielectric multilayer film mirror (106) and converging the illumination light (Li) and laser beam (Lr).

1 Claim, 19 Drawing Sheets

(51) Int. Cl.
  *G02B 5/28* (2006.01)
  *G03B 15/02* (2006.01)
  *G03B 15/03* (2006.01)
  *G03B 15/05* (2006.01)
  *H04N 9/31* (2006.01)

(52) U.S. Cl.
  CPC .............. *G03B 15/03* (2013.01); *G03B 15/05* (2013.01); *H04N 9/3161* (2013.01); *G02F 2203/02* (2013.01); *G02F 2203/055* (2013.01); *G02F 2203/12* (2013.01); *G03B 2215/0567* (2013.01); *G03B 2215/0571* (2013.01); *G03B 2215/0592* (2013.01)

(56) References Cited

FOREIGN PATENT DOCUMENTS

| | | | | |
|---|---|---|---|---|
| JP | 2004-327769 | 11/2004 | | |
| JP | 2006-035775 | * 4/2006 | ................ | G02F 1/13 |
| JP | 2006-350123 | 12/2006 | | |
| JP | 2007-029983 | * 2/2007 | ................ | G02F 1/13 |
| JP | 2007-29983 | 2/2007 | | |
| JP | 2008-221237 | 9/2008 | | |
| JP | 2009-093175 | 4/2009 | | |
| JP | 2009-175441 | 8/2009 | | |
| JP | 2010-004008 | 1/2010 | | |
| WO | 2006/035775 | 4/2006 | | |
| WO | WO 2006-035775 | * 4/2006 | ................ | G02F 1/13 |

OTHER PUBLICATIONS

English translation of JP 2007-029983, translated on Feb. 12, 2013.*
English translation of WO 2006-035775, translated on Feb. 12, 2013.*
English translation of JP 2009-175441, machine translated on Sep. 13, 2013.*

* cited by examiner

LIGHT MODULATING DEVICE AND LASER PROCESSING DEVICE

TECHNICAL FIELD

The present invention relates to a light modulating device and laser processing device provided with a reflective spatial light modulator.

BACKGROUND ART

Patent Literature 1 discloses a device using a reflective spatial light modulator (SLM). In the device disclosed in the literature, two mirrors are arranged on a virtual reference straight line, while a reflective SLM is disposed at a position vertically shifted from the virtual reference straight line. Input light entering along the virtual reference straight line is reflected by one of the mirrors, so as to impinge on the SLM. This light is modulated by the SLM, reflected by the other mirror, and then outputted along the virtual reference straight line.

Techniques for applying the SLM to laser processing devices, microscopes, and the like have recently been under study. In the case where the SLM is applied to a laser processing device, for example, phase-modulating a laser beam with a phase-modulating SLM and converging the phase-modulated laser beam at a processing site through a light collecting lens can compensate for the aberration at the converging point, thereby enhancing the processing accuracy.

In the case where the SLM is applied to a microscope, a subject site must be observed while being illuminated with light. In the case where the SLM is applied to a processing device, it is also desirable for the subject site (processing site) to be observable in order to specify the processing position with a high accuracy. Therefore, in general, the subject site is irradiated with illumination light having a wavelength different from that of the laser beam, and the reflected light or scattered light (hereinafter referred to as observation light) generated at the subject site upon irradiation with the illumination light is received, so as to observe the site.

CITATION LIST

Patent Literature

Patent Literature 1: International Publication No. 2006/035775 Pamphlet

SUMMARY OF INVENTION

Technical Problem

When observing the subject site with the above-mentioned illumination light in the structure disclosed in Patent Literature 1, for example, the laser beam and the illumination light are fed onto the same optical path in a superposing manner and reflected by the mirrors and SLM, and then the observation light reflected or scattered from the subject site is received as being branched out from the laser beam. In such a structure, however, a component polarized identically to the laser beam included in the illumination light and observation light is also modulated by the SLM, so that the observation light decreases its quantity when received, thereby worsening the resolution.

In view of the problems mentioned above, it is an object of the present invention to provide a light modulating device and a laser processing device by which subject sites can be observed while keeping the resolution and quantity of observation light.

Solution to Problem

For achieving the above-mentioned object, a light modulating device in accordance with the present invention is a light modulating device for modulating a laser beam and outputting the modulated laser beam and illumination light having a wavelength different from that of the laser beam onto the same optical path, the light modulating device comprising a reflective spatial light modulator for receiving obliquely in front thereof the laser beam entering along a first optical path extending in a first direction, and modulating the laser beam for each of a plurality of two-dimensionally arranged pixels while reflecting the laser beam; a dielectric multilayer film mirror, formed on a light transmitting member transparent to the illumination light, for reflecting the laser beam incident on a front face thereof from the spatial light modulator onto a second optical path extending in a second direction intersecting the first direction, and transmitting therethrough the illumination light incident on a rear face thereof onto the second optical path; and a light collecting lens for receiving the illumination light and laser beam from the dielectric multilayer film mirror and converging the illumination light and laser beam.

In the above-mentioned light modulating device, the laser beam enters along the first optical path and reaches the reflective SLM. The laser beam is modulated by the reflective SLM and then reaches the dielectric multilayer film mirror. On the other hand, the illumination light impinges on the dielectric multilayer film mirror from the rear side thereof and passes therethrough. Both the laser beam and illumination light advance on the second optical path and are converged by the light collecting lens, so as to reach a subject site of an object to be processed or observed. The observation light obtained by reflection or scattering at the subject site travels the optical path in a direction the reverse of the illumination light mentioned above. Thus, the above-mentioned light modulating device can prevent the illumination light and observation light from being modulated by the reflective SLM. Therefore, the subject site can be observed while keeping the resolution and quantity of the observation light.

The light modulating device may be characterized in that the first optical path passes behind the dielectric multilayer film mirror. Alternatively, the light modulating device may be characterized in that the first optical path passes in front of the dielectric multilayer film mirror, while the first and second optical paths intersect each other as seen in a third direction orthogonal to the first and second directions. In particular, the light modulating device can be made smaller when the first optical path passes in front of the dielectric multilayer film mirror than when it passes behind the latter. This can further lower the angle at which the laser beam is incident on the reflective SLM, thereby reducing the crosstalk between pixels.

A laser processing device in accordance with the present invention is a laser processing device for processing an object to be processed by irradiating the object with a laser beam while locating a converging point within the object, the laser processing device comprising a laser light source for emitting the laser beam; an illumination light source for emitting illumination light having a wavelength different from that of the laser beam; a reflective spatial light modulator for receiving obliquely in front thereof the laser beam entering along a first optical path extending in a first direction, and modulating the laser beam for each of a plurality of two-dimensionally arranged pixels while reflecting the laser beam; a dielectric multilayer film mirror, formed on a light transmitting member transparent to the illumination light, for reflecting the laser beam incident on a front face thereof from the spatial light modulator onto a second optical path extending in a second direction intersecting the first direction, and transmitting therethrough the illumination light incident on a rear face thereof onto the second optical path; and a light collecting lens for receiving the illumination light and laser beam from the dielectric multilayer film mirror and converging the illumination light and laser beam into the object.

By modulating the laser beam with the reflective SLM and converging the modulated laser beam at a processing site through the light collecting lens, the above-mentioned laser processing device can correct the aberration at the converging point, for example, thereby enhancing the processing accuracy. In the laser processing device, as in the light modulating device mentioned above, the laser beam enters along the first optical path and reaches the reflective SLM. The laser beam is modulated by the reflective SLM and then reaches the dielectric multilayer film mirror. On the other hand, the illumination light impinges on the dielectric multilayer film mirror from the rear side thereof and passes therethrough. Both the laser beam and illumination light advance on the second optical path and are converged by the light collecting lens, so as to reach a site to be processed in the object to be processed. The observation light obtained by reflection or scattering at the site to be processed travels the optical path in a direction the reverse of the illumination light mentioned above. Thus, the above-mentioned laser processing device can prevent the illumination light and observation light from being modulated by the reflective SLM, whereby the site to be processed can be observed while keeping the resolution and quantity of the observation light.

The laser processing device may be characterized in that it further comprises imaging means for capturing observation light generated when the illumination light is reflected or scattered by the object to be processed. This makes it possible to favorably observe the site to be processed. Preferably, in this case, the imaging means captures the observation light transmitted through the dielectric multilayer film mirror along the second optical path. This makes it unnecessary to place an optical component for branching out the observation light from the other light (the laser beam and illumination light) on the second optical path and thus can reduce the aberration caused by such an optical component.

A light modulating device in accordance with the present invention comprises a light source unit for emitting a laser beam and illumination light having respective wavelengths different from each other onto the same optical path; a first dielectric multilayer film mirror, formed on a first light transmitting member transparent to the illumination light, for receiving the laser beam and illumination light from the light source unit, reflecting the laser beam, and transmitting therethrough the illumination light; a reflective spatial light modulator for receiving obliquely in front thereof the laser beam from the first dielectric multilayer film mirror, and modulating the laser beam for each of a plurality of two-dimensionally arranged pixels while reflecting the laser beam; a second dielectric multilayer film mirror, formed on the first light transmitting member or a second light transmitting member transparent to the illumination light, provided separately from the first light transmitting member, for reflecting the laser beam received from the spatial light modulator and transmitting therethrough the illumination light received from the first dielectric multilayer film mirror onto the same optical path as with the reflected laser beam; and a light collecting lens for receiving the illumination light and laser beam from the second dielectric multilayer film mirror and converging the illumination light and laser beam.

In the above-mentioned light modulating device, the laser beam and illumination light are fed from the light source unit onto the same optical path and then impinge on the first dielectric multilayer film mirror. The first dielectric multilayer film mirror separates the laser beam and illumination light from each other, whereby only the laser beam impinges on the reflective SLM. Thereafter, the laser beam and illumination light modulated by the reflective SLM are caused to advance on the same optical path again by the second dielectric multilayer film mirror, so as to reach a subject site of an object to be processed or observed. The observation light obtained by reflection or scattering at the subject site travels the optical path in a direction the reverse of the illumination light mentioned above. Thus, this light modulating device can prevent the illumination light and observation light from being modulated by the reflective SLM, whereby the subject site can be observed while keeping the resolution and quantity of the observation light.

The light modulating device may be characterized in that the first light transmitting member is constituted by a prism, the first dielectric multilayer film mirror is formed on a first surface of the prism, the second dielectric multilayer film mirror is formed on a second surface of the prism, and the illumination light propagates from the first surface to the second surface through the prism. Such a configuration can favorably achieve a structure in which the laser beam and illumination light are separated from each other into respective optical paths by the first dielectric multilayer film mirror and are rejoined together into the same optical path by the second dielectric multilayer film mirror. Also, since it is unnecessary to adjust the angles of the first and second dielectric multilayer film mirrors and the optical path of the illumination light transmitted therethrough, the light modulating device can be assembled easily.

Advantageous Effects of Invention

The light modulating device and laser processing device in accordance with the present invention make it possible to observe subject sites while keeping the resolution and quantity of observation light.

REFERENCE SIGNS LIST

101A to 101C . . . light modulating device; 102A to 102C . . . laser processing device; 103 . . . housing; 103a to 103d . . . side wall; 105 . . . light transmitting member; 106, 122, 129, 138 . . . dielectric multilayer film mirror; 107, 121, 170 . . . reflective SLM; 109, 125 . . . light collecting lens; 111 . . . illumination light source; 113 . . . observation unit; 115 . . . half mirror; 117 . . . laser light source; 119, 127 . . . dichroic mirror; 120 . . . laser light source; 123 . . . observation optical system; 124 . . . AF unit; 126 . . . reflector; 130 to 132 . . . aperture; 133 . . . tilting mechanism; 134 . . . circuit board; 135 . . . cylindrical member; 137 . . . main unit; 191 . . . object; A1, B1 . . . first optical path; A2, B2 . . . second optical path; La, Lr . . . laser beam; Li . . . illumination light; Lo . . . observation light; 201A, 201B . . . light modulating device; 202 . . . SLM module; 203 . . . housing; 203a . . . aperture; 203b . . . bottom plate; 203c . . . top plate; 204 . . . tilting mechanism; 205 . . . circuit board; 211, 221 . . . light source; 231 . . . observation unit; 241 . . . half mirror; 242 . . . dichroic mirror; 243 . . . prism; 243a . . . first surface; 243b . . . second surface; 243c . . . third surface; 244a . . . (first) dielectric multilayer film mirror; 244b . . . (second) dielectric multilayer film mirror; 245, 246 . . . light transmitting plate; 251 . . . reflective SLM; 252 . . . driving unit; 261 . . . light collecting lens; 291 . . . object; Li . . . illumination light; Lo . . . observation light; Lr . . . laser beam

DESCRIPTION OF EMBODIMENTS

In the following, embodiments of the light modulating device and laser processing device in accordance with the present invention will be explained in detail with reference to the accompanying drawings. In the explanation of drawings, the same constituents will be referred to with the same signs while omitting their overlapping descriptions.

First Embodiment

Figure 1:
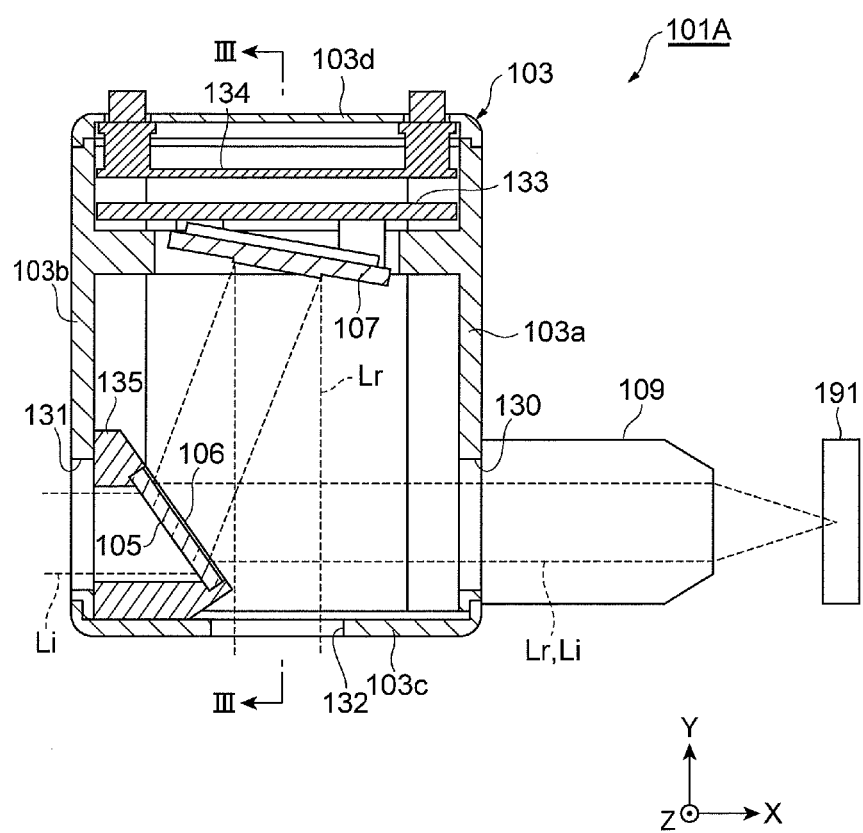
FIG. 1 is a horizontal sectional view of a light modulating device 101A in accordance with a first embodiment, illustrating the structure thereof.
Figure 2:
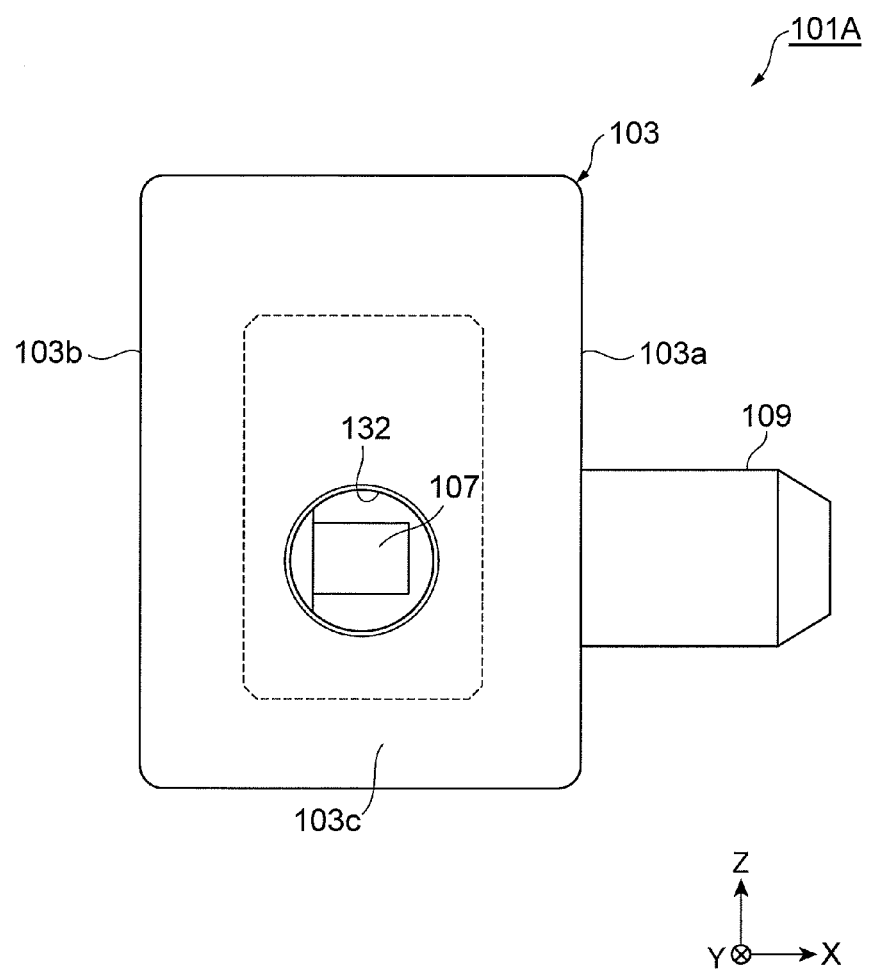
FIG. 2 is a bottom view of the light modulating device 101A.
Figure 3:
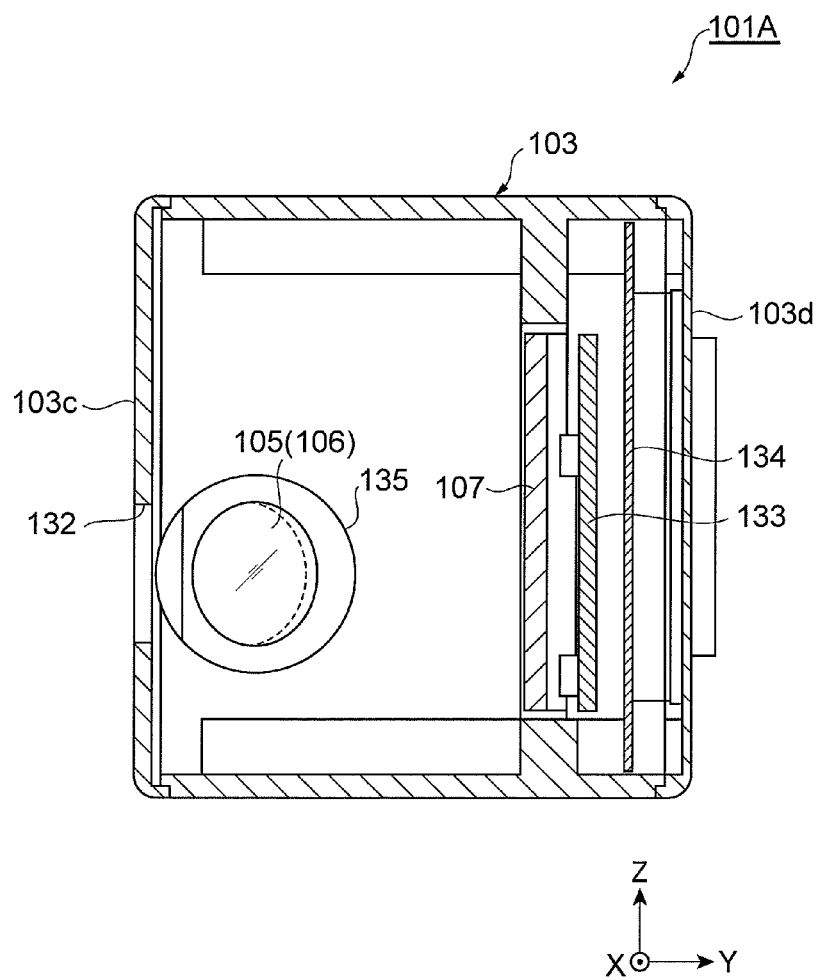
FIG. 3 is a sectional side elevation of the light modulating device 101A taken along the line III-III of FIG. 1.
Figure 4:
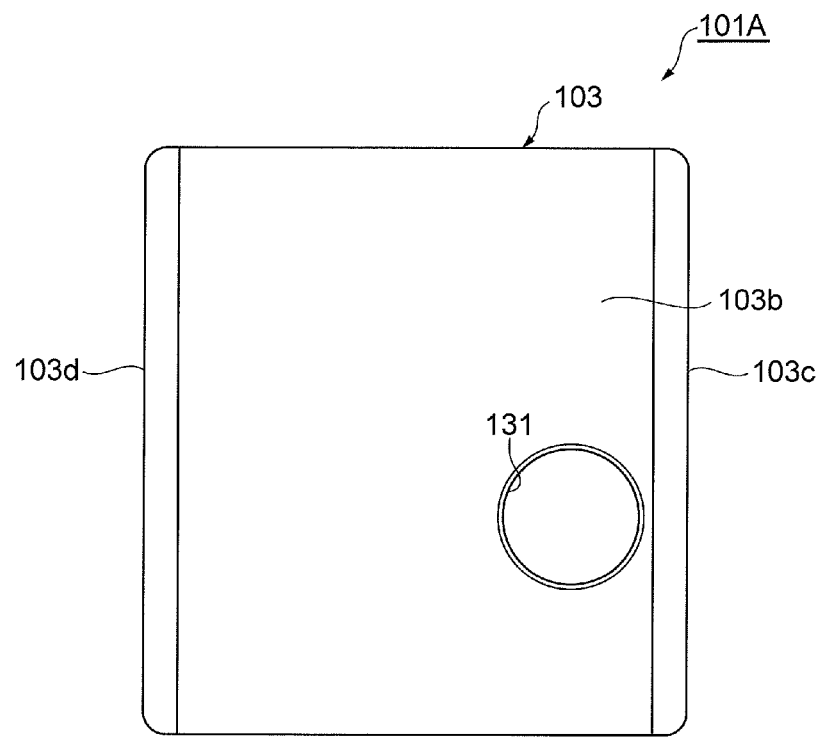
FIG. 4 is a side view of the light modulating device 101A as seen in a direction opposite to the arrowed direction of the line III-III.
Figure 4:
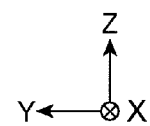

FIGS. 1 to 4 are views illustrating the structure of the light modulating device 101A in accordance with the first embodiment of the present invention. FIG. 1 is a horizontal sectional view of the light modulating device 101A, while FIG. 2 is a bottom view thereof. FIG. 3 is a sectional side elevation of the light modulating device 101A taken along the line III-III of FIG. 1, while FIG. 4 is a side view of the light modulating device 101A as seen in a direction opposite to the arrowed direction of the line III-III. FIGS. 1 to 4 illustrate an XYZ orthogonal coordinate system in order to make them easier to understand.

The light modulating device 101A of this embodiment is a device which modulates a laser beam Lr (see FIG. 1) fed from the outside and outputs the modulated laser beam Lr and illumination light Li (see FIG. 1) having a wavelength different from that of the laser beam Lr onto the same optical path. Referring to FIGS. 1 to 4, the light modulating device 101A of this embodiment comprises a housing 103, a dielectric multilayer film mirror 106 and a reflective SLM 107 which are accommodated within the housing 103, and a light collecting lens 109 attached to a side wall of the housing 103.

The housing 103 has a substantially rectangular parallelepiped exterior. In a pair of side walls 103a, 103b of the housing 103, one side wall 103a is formed with an aperture 130, while the light collecting lens 109 is attached to the side wall 103a so as to close the aperture 130. The other side wall 103b is provided with an aperture 131, through which the illumination light Li enters from a light source which is not depicted. That is, the aperture 131 serves as an opening through which light having a wavelength different from that of the laser beam passes.

In a different pair of side walls 103c, 103d arranged in a row in a direction intersecting the direction in which the side walls 103a, 103b of the housing 103 are arranged in a row, one side wall 103c is provided with an aperture 132. Through the aperture 132, the laser beam Lr enters from a light source which is not depicted. The laser beam Lr enters the housing 103 along a first optical path extending in a first direction (Y-axis direction in this embodiment). On the other hand, the illumination light Li enters the housing 103 along a second optical path extending in a second direction (X-axis direction in this embodiment) intersecting the first direction.

The reflective SLM 107 receives obliquely in front thereof the laser beam Lr entering along the first optical path and modulates the laser beam Lr for each of a plurality of two-dimensionally arranged pixels while reflecting the laser beam Lr. The reflective SLM 107 is arranged at a position closer to the side wall 103d opposing the aperture 132 within the housing 103, while the laser beam Lr passes in front of the dielectric multilayer film mirror 106, which will be explained later, so as to impinge on the reflective SLM 107. The reflective SLM 107 is supported by a tilting mechanism 133. The tilting mechanism 133 is secured to the housing 103 in order to adjust the angle of the reflective SLM 107 and supports the reflective SLM 107. The reflective SLM 107 has an attitude angle adjusted by the tilting mechanism 133 such as to reflect the laser beam Lr to the dielectric multilayer film mirror 106 that will be explained later. A circuit board 134 for controlling the reflective SLM 107 is disposed between the tilting mechanism 133 and the side wall 103d of the housing 103.

The reflective SLM 107 in this embodiment is of a phase modulation type and has a structure which will be explained in the following, for example.

Figure 5:
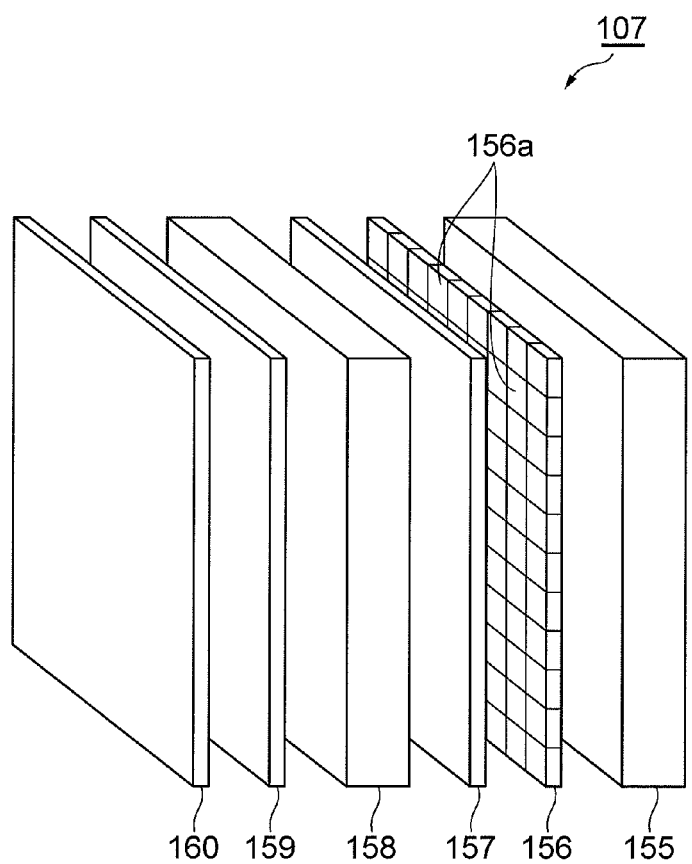
FIG. 5 is an exploded perspective view illustrating an LCOS type structure as an example of a reflective SLM 107.

FIG. 5 is an exploded perspective view illustrating an LCOS (Liquid Crystal on Silicon) type structure as an example of the reflective SLM 107. As illustrated in FIG. 5, the reflective SLM 107 has a silicon substrate 155, a plurality of pixel electrodes 156 disposed on the silicon substrate 155, a mirror layer 157 disposed on the pixel electrodes 156, an undepicted substrate provided with an alignment film and disposed on the mirror layer 157, a glass sheet 160, a transparent electrode 159 attached to the glass sheet 160, and an undepicted substrate equipped with an alignment film and disposed on the transparent electrode 159, while a liquid crystal layer 158 is arranged between the alignment films (between the pixel electrode 156 and transparent electrode 159 in the drawing). The pixel electrode 156 has a plurality of electrode units 156*a* arranged in a two-dimensional matrix constituted by a plurality of rows and a plurality of columns, while each pixel electrode unit 156*a* of the pixel electrode 156 opposes the transparent electrode 159 in the laminating direction of the reflective SLM 107.

In thus constructed reflective SLM 107, the laser beam Lr passes through the glass sheet 160 and transparent electrode 159 in sequence from the outside, so as to enter the liquid crystal layer 158, and is reflected by the mirror layer 157, so as to pass through the liquid crystal layer 158, transparent electrode 159, and glass sheet 160 in sequence, thereby exiting to the outside. Here, a voltage is applied between the transparent electrode 159 and each of the pixel electrode units 156*a* opposing thereto, whereby the refractive index in a part held between a pair of electrode units 156*a*, 159 opposing each other in the liquid crystal layer 158 changes according to the voltage in the pixel electrode unit. This generates a shift in the phase of a component in a predetermined direction orthogonal to the advancing direction of the laser beam Lr in each of the plurality of pixels, thereby shaping (phase-modulating) the laser beam Lr for each pixel.

Referring to FIGS. 1 to 4 again, the dielectric multilayer film mirror 106 is formed on a sheet surface of a sheet-like light transmitting member 105. The light transmitting member 105, which can transmit therethrough a wavelength of light included in the illumination light Li (light having a wavelength different from that of laser beams), is secured onto an oblique end face of a cylindrical member 135 attached to the side wall 103*b* of the housing 103 in communication with the aperture 131. The light transmitting member 105 has an attitude angle defined by the member 135 such that the laser beam Lr incident on the front face of the dielectric multilayer film mirror 106 from the reflective SLM 107 is reflected onto the second optical path extending in the second direction (X-axis direction). The dielectric multilayer film mirror 106 transmits therethrough the illumination light Li incident on the rear face thereof through the light transmitting member 105 onto the second optical path as with the laser beam Lr. That is, the dielectric multilayer film mirror 106 can transmit therethrough light having a wavelength different from that of laser beams. Therefore, the laser beam Lr and illumination light Li advance on the same optical path from the dielectric multilayer film mirror 106. When seen in a third direction (Z-axis direction) orthogonal to the first direction (Y-axis direction) and second direction (X-axis direction), the first optical path of the laser beam Lr incident on the reflective SLM 107 and the second optical path of the laser beam Lr emitted from the dielectric multilayer film mirror 106 intersect each other (are orthogonal to each other in this embodiment).

The light collecting lens 109 is disposed on the optical path (second optical path) of the laser beam Lr and illumination light Li emitted from the dielectric multilayer film mirror 106. The light collecting lens 109 converges the laser beam Lr reflected by the dielectric multilayer film mirror 106 after being outputted from the reflective SLM 107 and the illumination light Li transmitted through the dielectric multilayer film mirror 106 and focuses the laser beam Lr at a subject site (site to be processed or observed) of an object 191. The light collecting lens 109 inputs therein light (i.e., observation light) generated from the illumination light Li when the latter is reflected or scattered by the object 191, and outputs the observation light to the dielectric multilayer film mirror 106. As the light collecting lens 109, an afocal objective lens is used favorably.

Figure 6:
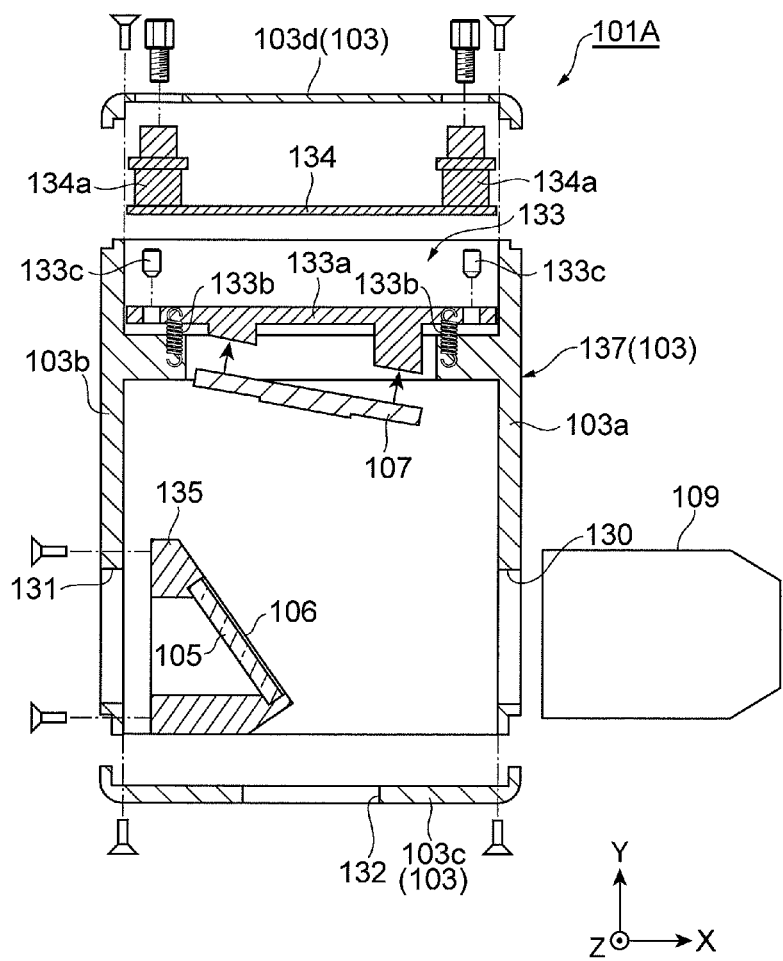
FIG. 6 is an assembly view of the light modulating device 101A.

FIG. 6 is an assembly view of the light modulating device 101A in accordance with this embodiment. As illustrated in FIG. 6, when assembling the light modulating device 101A, a main unit 137 having the side walls 103*a*, 103*b* of the housing 103 is prepared at first. Both Y-axis ends of the main unit 137 are open, the side wall 103*c* is fastened to one end with screws, and the side wall 103*d* is fastened to the other end with screws. The side walls 103*a*, 103*b*, 103*c* are formed beforehand with the apertures 130, 131, and 132, respectively.

The light transmitting member 105 having the dielectric multilayer film mirror 106 formed on a sheet surface thereof is secured onto an oblique end face of the cylindrical member 135 beforehand. The cylindrical member 135 is fastened to the side wall 103*b* with screws such that its inner hole communicates with the aperture 131 of the side wall 103*b*. The light collecting lens 109 is secured to the outer side of the side wall 103*a* so as to cover the aperture 130 of the side wall 103*a*.

The tilting mechanism 133 is constituted by a base plate 133*a*, a plurality of spring members 133*b*, and a plurality of screw members 133*c*, for example, as illustrated in FIG. 6. The base plate 133*a* shaped like a sheet has a plurality of pillars projecting in the Y-axis direction in order to support the reflective SLM 107, while the plurality of pillars vary their lengths so as to be able to support the reflective SLM 107 in a tilted state. The plurality of spring members 133*b* extend in the Y-axis direction, each having both ends engaging the base plate 133*a* and the main unit 137 of the housing 103, respectively, thereby pulling the base plate 133*a* and the main unit 137 of the housing 103 toward each other in the Y-axis direction. On the other hand, the plurality of screw members 133*c* are screwed into a peripheral part of the base plate 133*a* while projecting to the interstice between the base plate 133*a* and main unit 137, so as to define the gap between the base plate 133*a* and main unit 137. Individually adjusting the respective amounts of projection of the plurality of screw members 133*c* can regulate the tilting angle of the base plate 133*a*, i.e., the tilting angle of the reflective SLM 107.

The circuit board 134 is disposed between the tilting mechanism 133 and side wall 103*d*. A peripheral part of the circuit board 134 is provided with a plurality of pillars 134*a*, which are fastened to the inner side of the side wall 103*d* with screws, whereby the circuit board 134 is secured to the side wall 103*d*.

Operations and effects of the light modulating device 101A of this embodiment having the foregoing structure will now be explained. In the light modulating device 101A in accordance with this embodiment, as illustrated in FIG. 1, the laser beam Lr enters from an undepicted light source unit along the first optical path and then reaches the reflective SLM 107. After being modulated by the reflective SLM 107, the laser beam Lr reaches the dielectric multilayer film mirror 106. On the other hand, the illumination light Li impinges on the dielectric multilayer film mirror 106 from the rear side thereof and passes therethrough. The laser beam Lr and illumination light Li advance on the same optical path (second optical path), so as to be converged by the light collecting lens 109, and then reach a subject site of the object 191 such as an object to be processed or observed. The observation light obtained by reflection or scattering at the subject site travels the optical path in a direction the reverse of the illumination light Li mentioned above. That is, the observation light passes through the dielectric multilayer film mirror 106 and light transmitting member 105, so as to be outputted through the aperture 131 and observed with an image pickup device or the like.

Thus, in the light modulating device 101A in accordance with this embodiment, the illumination light Li and observation light pass through the dielectric multilayer film mirror 106 and light transmitting member 105, so as not to impinge on the reflective SLM 107. That is, the light modulating device 101A can prevent the illumination light Li and observation light from being modulated by the reflective SLM 107, whereby the subject site can be observed while keeping the resolution and quantity of the observation light.

Figure 7:
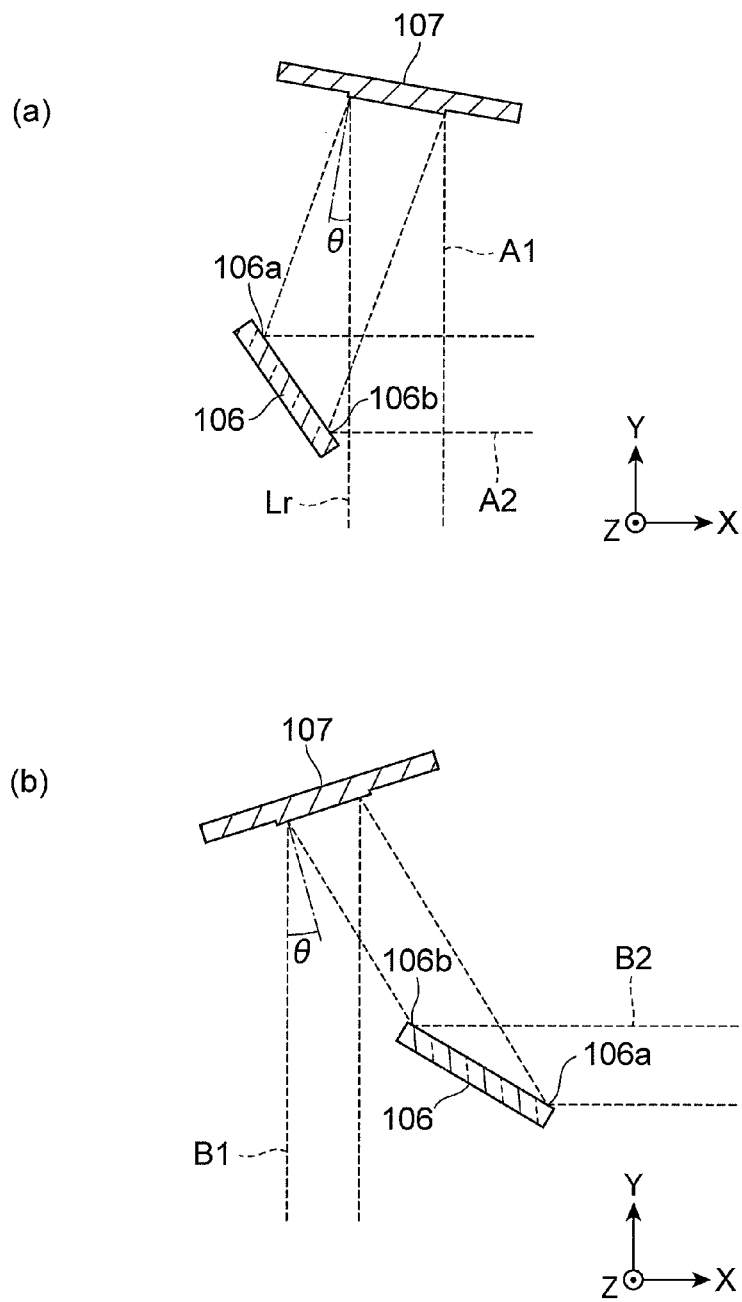
FIGS. 7(a) and (b) illustrate the positional relationships between a dielectric multilayer film mirror 106 and the reflective SLM 107 in the first embodiment and a modified example, respectively.

The positional relationship between the dielectric multilayer film mirror 106 and reflective SLM 107 will now be explained in detail. FIG. 7(a) illustrates the positional relationship between the dielectric multilayer film mirror 106 and reflective SLM 107 in this embodiment. That is, the first optical path A1 of the laser beam Lr extending in the Y-axis direction passes in front of the dielectric multilayer film mirror 106 and reaches the reflective SLM 107. In other words, the dielectric multilayer film mirror 106 is located behind the first optical path A1. The reflective SLM 107 is slightly tilted to the rear side, so as to reflect the laser beam Lr to the dielectric multilayer film mirror 106. Since the dielectric multilayer film mirror 106 reflects the laser beam Lr forward (i.e., onto the second optical path A2 extending in the X-axis direction), the first and second optical paths A1, A2 intersect each other as seen in the Z-axis direction.

FIG. 7(b) illustrates the positional relationship between the dielectric multilayer film mirror 106 and reflective SLM 107 in accordance with a modified example. Even when the dielectric multilayer film mirror 106 and reflective SLM 107 have such a positional relationship therebetween, the light modulating device 101A can favorably achieve the operations and effects mentioned above. In the example illustrated in FIG. 7(b), the first optical path B1 passes behind the dielectric multilayer film mirror 106, so as to reach the reflective SLM 107. In other words, the dielectric multilayer film mirror 106 is located in front of the first optical path B1. The reflective SLM 107 is slightly tilted to the front side, so as to reflect the laser beam Lr to the dielectric multilayer film mirror 106. In such a structure, the first and second optical paths B1, B2 do not intersect each other as seen in the Z-axis direction.

While the light modulating device 101A may employ any of the structures illustrated in FIGS. 7(a) and 7(b), the structure illustrated in FIG. 7(a) is more preferred. The following are reasons therefor.

First, the light modulating device 101A can be made smaller when the first optical path A1 passes in front of the dielectric multilayer film mirror 106 as in FIG. 7(a) than when it passes behind the latter as in FIG. 7(b). This is because the distance from the first optical path A1 to the part 106a of the dielectric multilayer film mirror 106 farthest therefrom can be made shorter in the structure of FIG. 7(a) than in the structure of FIG. 7(b).

Also, the incident angle θ can be made smaller in the structure illustrated in FIG. 7(a) than in the structure illustrated in FIG. 7(b). This is because the distance from the reflective SLM 107 to the part 106b of the dielectric multilayer film mirror 106 closest to the first optical path A1 can be made longer in the structure of FIG. 7(a) than in the structure of FIG. 7(b).

Figure 8:
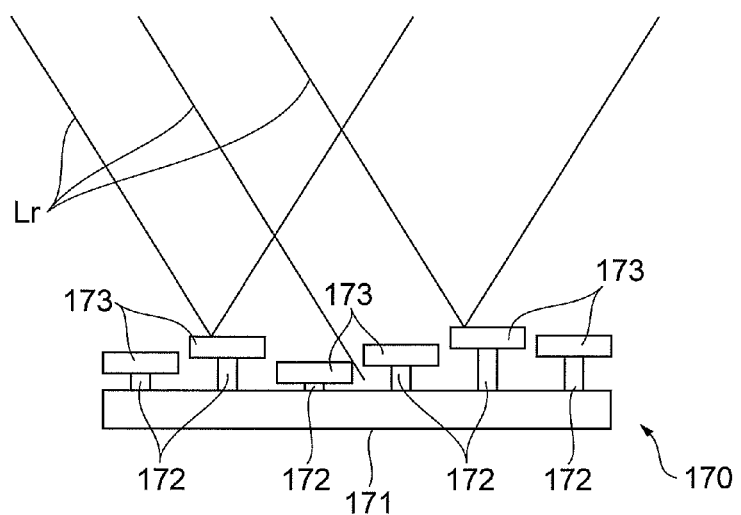
FIG. 8 is a view illustrating an example of moirés (interference fringes) M in the reflective SLM 107.

While this embodiment uses the reflective SLM 107 having the structure illustrated in FIG. 5, the light modulating device 101A may be equipped with other forms of reflective SLM. FIG. 8 is a view illustrating another structural example of the reflective SLM. The reflective SLM 170 illustrated in FIG. 8 is equipped with a structure employing MEMS (Micro Electro Mechanical Systems). The reflective SLM 170 comprises a silicon substrate 171, a plurality of actuators 172 two-dimensionally arranged on the silicon substrate 171, and a plurality of reflecting units 173 respectively supported by the plurality of actuators 172. A pair of the actuator 172 and reflecting unit 173 constitute one pixel, while the phase of the laser beam Lr varies according to the height of the reflecting unit 173. Individually controlling the voltage applied to each actuator 172 can regulate the height of each reflecting unit 173, thereby phase-modulating the incident laser beam Lr for each pixel.

In such a MEMS type SLM, there is an interstice between the reflecting units 173 adjacent to each other. The laser beam Lr entering the interstice may adversely affect circuits formed on the silicon substrate 171. Since such a phenomenon becomes more remarkable as the incident angle θ of the laser beam Lr is greater, it will be more preferred if the structure illustrated in FIG. 7(a) is employed in order to lower the incident angle θ of the laser beam Lr when a MEMS type SLM such as the reflective SLM 170 is used.

Second Embodiment

Figure 9:
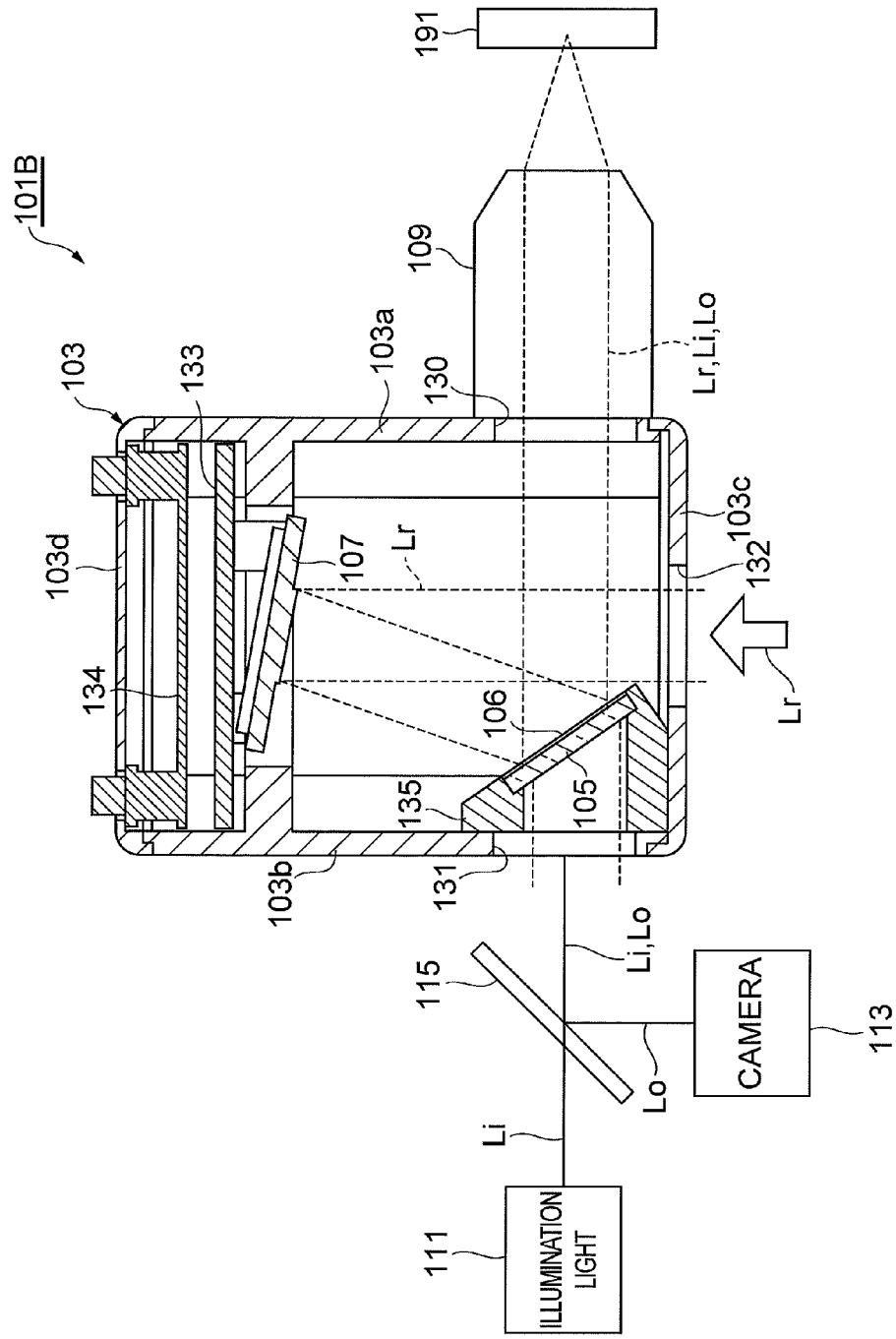
FIG. 9 is a view illustrating the structure of a light modulating device 101B in accordance with a second embodiment.

FIG. 9 is a view illustrating the structure of the light modulating device 101B in accordance with the second embodiment. In this embodiment, the housing 103, light transmitting member 105, dielectric multilayer film mirror 106, reflective SLM 107, and light collecting lens 109 have the same structures as those in the light modulating device 101A of the first embodiment mentioned above.

The light modulating device 101B in accordance with this embodiment further comprises an illumination light source 111, an observation unit 113, and a half mirror 115 in addition to the structure of the light modulating device 101A in accordance with the first embodiment. The illumination light source 111 is a light source for emitting the illumination light Li. As the illumination light Li, a halogen lamp is favorably used, for example.

The half mirror 115 is disposed between the illumination light source 111 and light transmitting member 105. The half mirror 115 transmits therethrough the illumination light Li emitted from the illumination light source 111 to the light transmitting member 105 and reflects observation light Lo arriving through the light transmitting member 105 to the observation unit 113. The observation unit 113 includes a solid-state image pickup device having a plurality of pixels arranged two-dimensionally, for example, receives the observation light Lo arriving from the half mirror 115 with the image pickup device, and acquires an image of a subject site of the object 191 according to the observation light Lo.

The light modulating device 101B of this embodiment includes a structure similar to that of the light modulating device 101A of the first embodiment mentioned above, whereby the illumination light Li and observation light Lo pass through the dielectric multilayer film mirror 106 and light transmitting member 105, so as not to impinge on the reflective SLM 107. That is, the light modulating device 101B can prevent the illumination light Li and observation light Lo from being modulated by the reflective SLM 107, whereby the subject site can be observed while keeping the resolution and quantity of the observation light Lo. Since the illumination light source 111, observation unit 113, and half mirror 115 are provided, the subject site can be observed favorably.

Third Embodiment

Figure 10:
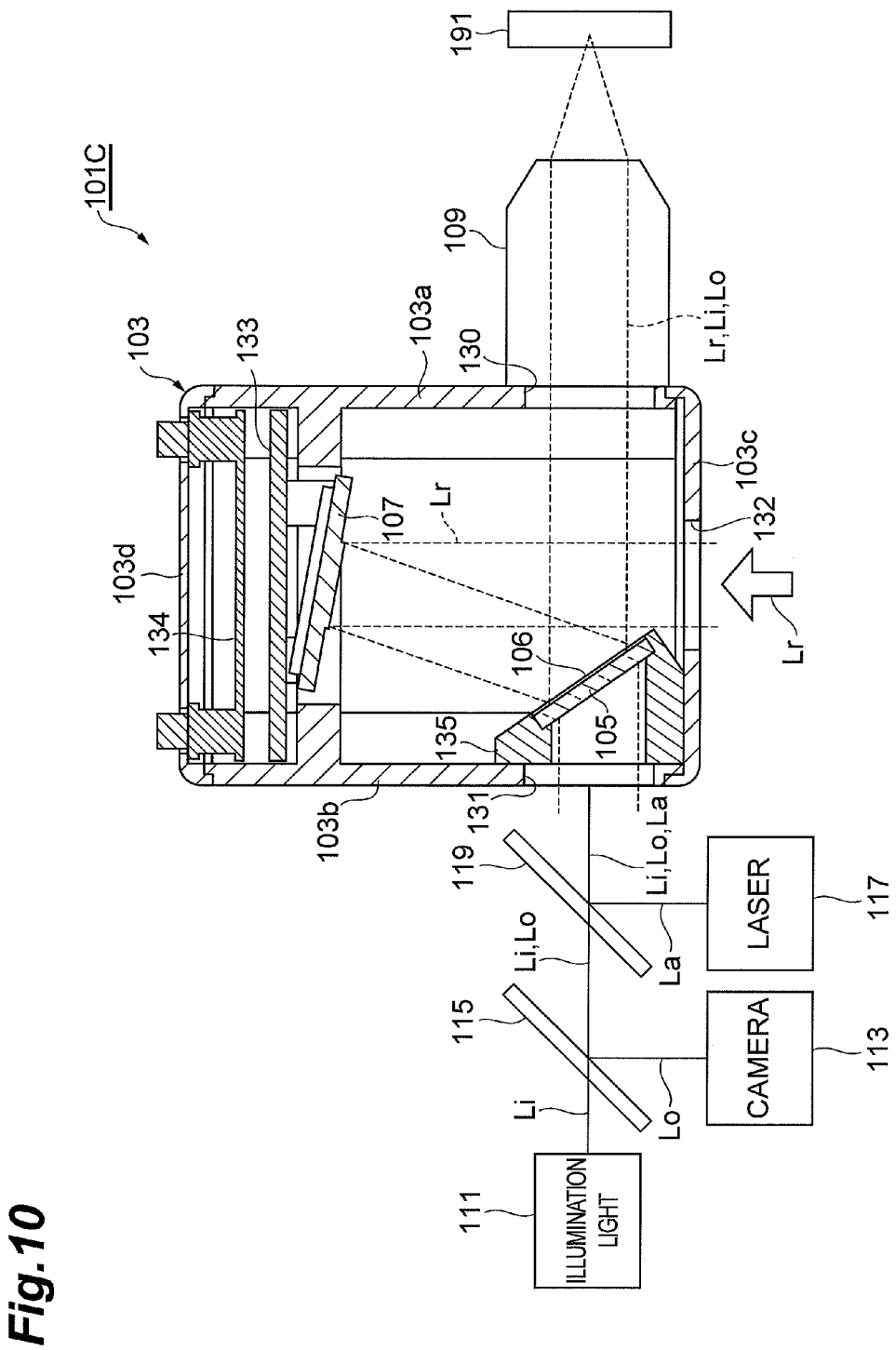
FIG. 10 is a view illustrating the structure of a light modulating device 101C in accordance with a third embodiment.

FIG. 10 is a view illustrating the structure of the light modulating device 101C in accordance with the third embodiment. In this embodiment, the housing 103, light transmitting member 105, dielectric multilayer film mirror 106, reflective SLM 107, and light collecting lens 109 have the same structures as those in the light modulating device 101A of the first embodiment mentioned above. The illumination light source 111, observation unit 113, and half mirror 115 have the same structures as those in the light modulating device 101B of the second embodiment mentioned above.

The light modulating device 101C in accordance with this embodiment further comprises a laser light source 117 and a dichroic mirror 119 in addition to the structure of the light modulating device 101B in accordance with the second embodiment. The laser light source 117 is a light source for emitting a laser beam La having a wavelength different from that of the illumination light Li. The laser beam La is a beam employed as an assist beam for the laser beam Lr, which is a beam to be modulated, or as an illumination beam different from the illumination light Li. The dichroic mirror 119 selectively reflects a specific wavelength of light and transmits therethrough the other wavelengths of light. That is, the dichroic mirror 119 reflects the laser beam La arriving from the laser light source 117 and transmits therethrough the illumination light Li arriving from the illumination light source 111 and the observation light Lo arriving from the object 191. The dichroic mirror 119 emits the laser beam La and illumination light Li having respective wavelengths different from each other onto the same optical path to the light transmitting member 105. Then, the laser beam La and illumination light Li reach the object 191 though the same optical path.

The light modulating device 101C of this embodiment includes a structure similar to that of the light modulating device 101A of the first embodiment mentioned above, whereby the illumination light Li and observation light Lo pass through the dielectric multilayer film mirror 106 and light transmitting member 105, so as not to impinge on the reflective SLM 107. That is, the light modulating device 101C can prevent the illumination light Li and observation light Lo from being modulated by the reflective SLM 107, whereby the subject site can be observed while keeping the resolution and quantity of the observation light Lo. Since the laser light source 117 and dichroic mirror 119 are provided, the subject site can be observed or processed more favorably.

Fourth Embodiment

Figure 11:
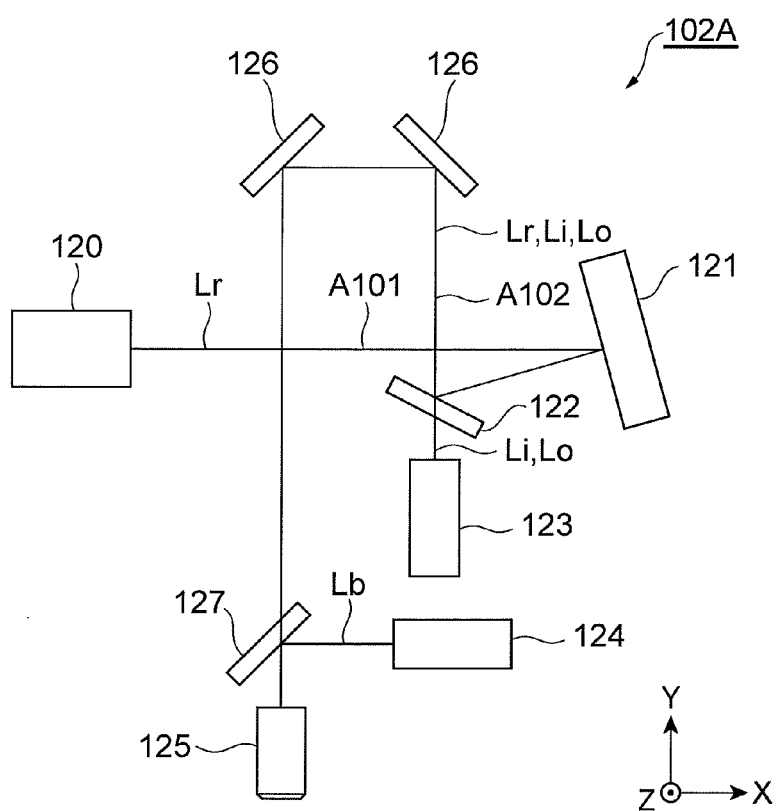
FIG. 11 is a view illustrating the structure of a laser processing device 102A in accordance with a fourth embodiment.

FIG. 11 is a view illustrating the structure of the laser processing device 102A in accordance with the fourth embodiment. The laser processing device 102A in accordance with this embodiment is a device which modulates a laser beam Lr fed from the outside, outputs the modulated laser beam Lr, and processes an object to be processed by irradiating the object with the laser beam Lr while locating a converging point within the object. FIG. 11 illustrates an XYZ orthogonal coordinate system in order to make it easier to understand.

Referring to FIG. 11, the laser processing device 102A of this embodiment comprises a laser light source 120, a reflective SLM 121, a dielectric multilayer film mirror 122, an observation optical system 123, an AF (Auto Focus) unit 124, a light collecting lens 125, reflectors 126, and a dichroic mirror 127.

The laser light source 120 is a light source for emitting the laser beam Lr that is a beam to be modulated. The laser beam Lr impinges on the reflective SLM 121 along a first optical path A101 extending in a first direction (X-axis direction in this embodiment). The first optical path A101 passes in front of the dielectric multilayer film mirror 122 as in the first embodiment. The reflective SLM 121 receives obliquely in front thereof the laser beam Lr and modulates the laser beam Lr for each of a plurality of two-dimensionally arranged pixels while reflecting the laser beam Lr. For example, the reflective SLM 121 has the same structure as with the reflective SLM 107 illustrated in FIG. 5 or the reflective SLM 170 illustrated in FIG. 8.

The observation optical system 123 is a constituent for emitting illumination light Li and acquiring an image produced by observation light Lo occurring when the illumination light Li is reflected or scattered by the object to be processed. The observation optical system 123 has an illumination light source such as a halogen lamp, for example, which emits the illumination light Li. The observation optical system 123 also has imaging means such as a solid-state image pickup device including a plurality of two-dimensionally arranged pixels, for example, receives the observation light Lo with the image pickup device, and acquires an image of a site to be processed in the object to be processed according to the observation light Lo.

The dielectric multilayer film mirror 122 is formed on a sheet surface of a sheet-like light transmitting member. The light transmitting member can transmit therethrough a wavelength of light included in the illumination light Li. The dielectric multilayer film mirror 122 has an attitude angle defined such that the laser beam Lr incident on the front face thereof is reflected onto a second optical path A102 extending in a second direction (Y-axis direction in this embodiment). The dielectric multilayer film mirror 122 transmits therethrough the illumination light Li incident on the rear face thereof through the light transmitting member onto the second optical path A102 as with the laser beam Lr. Therefore, the laser beam Lr and illumination light Li advance on the same optical path from the dielectric multilayer film mirror 122. The observation light Lo passes through the dielectric multilayer film mirror 122 along the second optical path A102. The observation optical system 123 captures the observation light Lo transmitted through the dielectric multilayer film mirror 122.

When seen in a third direction (Z-axis direction) orthogonal to the first direction (X-axis direction) and second direction (Y-axis direction), the first optical path A101 of the laser beam Lr incident on the reflective SLM 121 and the second optical path A102 of the laser beam Lr emitted from the dielectric multilayer film mirror 122 intersect each other (are orthogonal to each other in this embodiment).

The laser beam Lr and illumination light Li emitted from the dielectric multilayer film mirror 122 have their optical path changed by the two reflectors 126 and then pass through the dichroic mirror 127, so as to reach the light collecting lens 125. The light collecting lens 125 converges the laser beam Lr reflected by the dielectric multilayer film mirror 122 after being outputted from the reflective SLM 121 and the illumination light Li transmitted through the dielectric multilayer film mirror 122 and focuses the laser beam Lr at the site to be processed in the object to be processed. The light collecting lens 125 inputs therein the observation light Lo generated by the object to be processed and outputs the observation light Lo to the dielectric multilayer film mirror 122. As the light collecting lens 125, an afocal objective lens is used favorably.

The AF unit 124 is a constituent for accurately focusing the converging point of the laser beam Lr at a position separated by a predetermined distance from a surface of the object to be processed even when the surface is wavy. The AF unit 124 emits an AF laser beam Lb to be reflected by the dichroic mirror 127 and detects the AF laser beam Lb reflected by the surface of the object to be processed after being converged by the light collecting lens 125, so as to acquire displacement data of the surface of the object by using an astigmatic method, for example. According to thus acquired displacement data, the AF unit 124 moves the light collecting lens 125 back and forth along its optical axis so as to follow undulations of the surface, thereby minutely adjusting the distance between the light collecting lens 125 and the object to be processed.

By modulating the laser beam Lr with the reflective SLM 121 and converging the modulated laser beam Lr at the site to be processed with the light collecting lens 125, the laser processing device 102A of this embodiment can compensate for the aberration at the converging point, for example, thereby enhancing the processing accuracy.

The laser processing device 102A has the following operations and effects as with the light modulating device 101A of the first embodiment. That is, in the laser processing device 102A, the laser beam Lr enters along the first optical path A101 and reaches the reflective SLM 121. After being modulated by the reflective SLM 121, the laser beam Lr reaches the dielectric multilayer film mirror 122. On the other hand, the illumination light Li impinges on the dielectric multilayer film mirror 122 from the rear side thereof and passes therethrough. The laser beam Lr and illumination light Li advance together on the second optical path A102, so as to reach the site to be processed in the object to be processed by way of the two reflectors 126 and light collecting lens 125. The observation light Lo obtained by reflection or scattering at the site to be processed travels the optical path in a direction the reverse of the illumination light Li mentioned above. Thus, the laser processing device 102A of this embodiment can prevent the illumination light Li and observation light Lo from being modulated by the reflective SLM 121, whereby the site to be processed can be observed while keeping the resolution and quantity of the observation light Lo.

In the laser processing device 102A of this embodiment, the positional relationship between the dielectric multilayer film mirror 122 and reflective SLM 121 is the same as that illustrated in FIG. 7(a). That is, the first optical path A101 of the laser beam Lr extending in the X-axis direction passes in front of the dielectric multilayer film mirror 122 and reaches the reflective SLM 121. Since the dielectric multilayer film mirror 122 reflects the laser beam Lr to the front side (i.e., onto the optical path A102 extending in the Y-axis direction), the first and second optical paths A101, A102 intersect each other as seen in the Z-axis direction. Such a structure can make the laser processing device 102A smaller than in the case where the laser beam Lr passes behind the dielectric multilayer film mirror 122 as in FIG. 7(b), for example. This can also lower the angle at which the laser beam Lr is incident on the reflective SLM 121, thereby reducing the crosstalk between pixels in the reflective SLM 121, while suppressing the influence of moirés (interference fringes) in the reflective SLM 121.

The laser processing device 102A is preferably equipped with imaging means (i.e., the solid-state image pickup device included in the observation optical system 123) for capturing the observation light Lo as in this embodiment. This makes it possible to favorably observe the site to be processed. Preferably, the imaging means captures the observation light Lo transmitted through the dielectric multilayer film mirror 122 along the second optical path A102. This makes it unnecessary to place an optical component for branching out the observation light Lo from the other light (the laser beam Lr and illumination light Li) on the second optical path A102 and thus can reduce the aberration caused by such an optical component.

Fifth Embodiment

Figure 12:
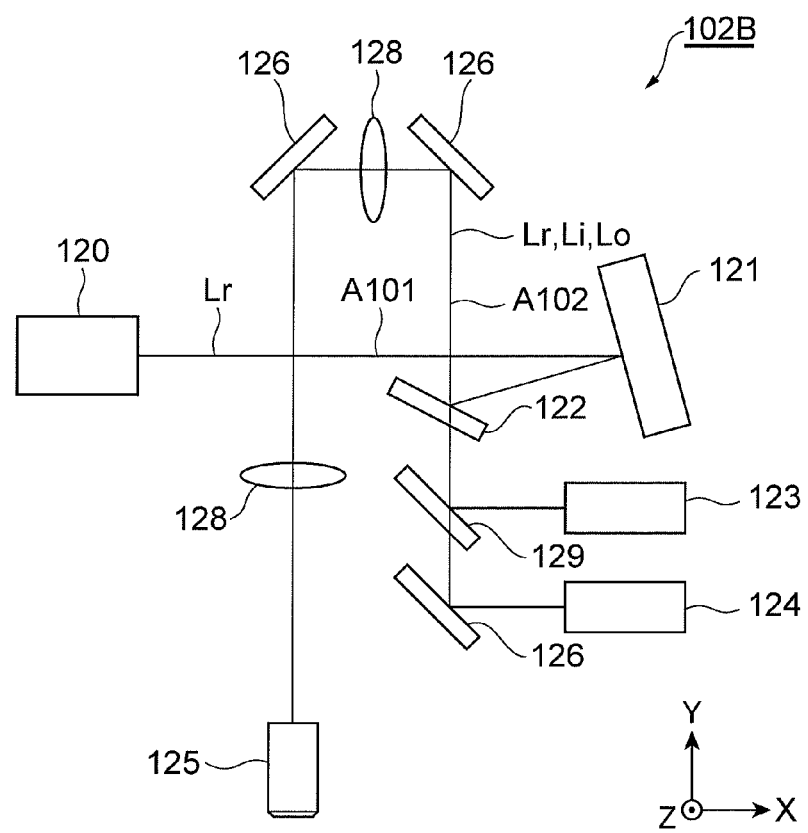
FIG. 12 is a view illustrating the structure of a laser processing device 102B in accordance with a fifth embodiment.

FIG. 12 is a view illustrating the structure of the laser processing device 102B in accordance with the fifth embodiment. The laser light source 120, reflective SLM 121, dielectric multilayer film mirror 122, light collecting lens 125, and reflectors 126 in this embodiment have the same structures as those in the laser processing device 102A of the fourth embodiment mentioned above.

In the laser processing device 102B of this embodiment, another dielectric multilayer film mirror 129 is disposed behind the dielectric multilayer film mirror 122, whereby the illumination light Li emitted from the observation optical system 123 impinges on the dielectric multilayer film mirror 122 after being reflected by the dielectric multilayer film mirror 129. The observation light Lo transmitted through the dielectric multilayer film mirror 122 enters the observation optical system 123 after being reflected by the dielectric multilayer film mirror 129.

An AF unit 124 is optically coupled to the rear side of the dielectric multilayer film mirror 129 through the reflector 126. The AF unit 124 has the same structure and function as that of the fourth embodiment. Lenses 128 are disposed between the light collecting lens 125 and reflector 126 and between the two reflectors 126. The lenses 128 form an image of a phase modulation surface of the reflective SLM 121 onto an exit pupil plane of the light collecting lens 125. Changing the focal length of the lenses enables 1:1 imaging, reduced imaging, and magnified imaging.

The laser processing device 102B of this embodiment includes the same structure as with the laser processing device 102A of the fourth embodiment mentioned above, whereby the illumination light Li and observation light Lo pass through the dielectric multilayer film mirror 122, so as not to impinge on the reflective SLM 121. That is, the laser processing device 102B of this embodiment can prevent the illumination light Li and observation light Lo from being modulated by the reflective SLM 121, whereby the site to be processed can be observed while keeping the resolution and quantity of the observation light Lo. Also, since the AF unit 124 is arranged behind the dielectric multilayer film mirror 129, an optical component on the optical paths of the illumination light Li and observation light Lo (the dichroic mirror 127 in FIG. 11) can further be eliminated, whereby the aberration caused by such an optical component can further be reduced.

Comparative Example

Figure 13:
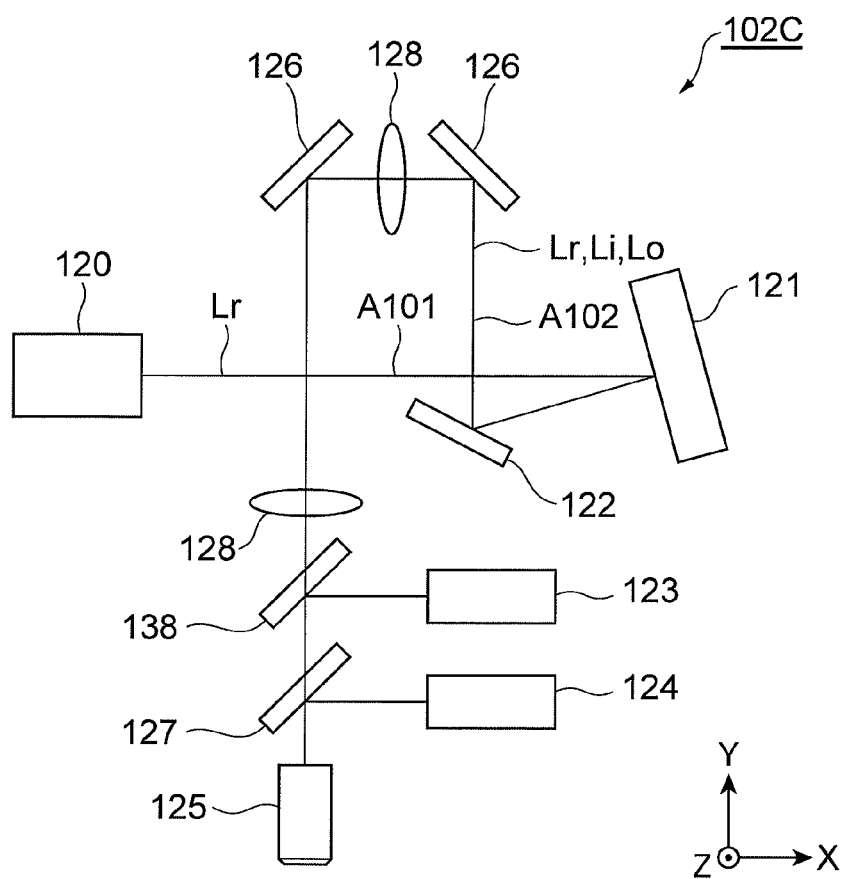
FIG. 13 is a view illustrating the structure of a laser processing device 102C as a comparative example for the fourth and fifth embodiments.

FIG. 13 is a view illustrating the structure of a laser processing device 102C as a comparative example for the fourth and fifth embodiments. The laser light source 120, reflective SLM 121, dielectric multilayer film mirror 122, AF unit 124, light collecting lens 125, and reflectors 126 in this comparative example have the same structures as those in the laser processing device 102A of the fourth embodiment mentioned above.

Unlike the laser processing device 102A illustrated in FIG. 11, the observation optical system 123 is not disposed behind the dielectric multilayer film mirror 122. The observation optical system 123 is optically coupled to the light collecting lens 125 through a dielectric multilayer film mirror 138 disposed between the light collecting lens 125 and reflector 126. In such a mode, the modulated laser beam Lr must pass through a plurality of dielectric multilayer film mirrors (127, 138), which cause the aberration to increase. By contrast, the above-mentioned fourth and fifth embodiments (FIGS. 11 and 12) reduce the number of optical components through which the modulated laser beam Lr must pass, whereby the aberration can effectively be lowered.

As in the above-mentioned fourth and fifth embodiments, the positional relationship between the dielectric multilayer film mirror 122 and reflective SLM 121 in the laser processing device 102C of the comparative example is the same as that illustrated in FIG. 7(a). That is, the first optical path A101 of the laser beam Lr extending in the X-axis direction passes in front of the dielectric multilayer film mirror 122, so as to reach the reflective SLM 121. Since the dielectric multilayer film mirror 122 reflects the laser beam Lr forward (i.e., onto the second optical path A102 extending in the Y-axis direction), the first and second optical paths A101, A102 intersect each other as seen in the Z-axis direction. Such a structure can make the laser processing device 102C smaller than in the case where the laser beam Lr passes behind the dielectric multilayer film mirror 122 as in FIG. 7(b), for example. This can also lower the angle at which the laser beam Lr is incident on the reflective SLM 121, thereby reducing the crosstalk between pixels in the reflective SLM 121, while suppressing the influence of moirés (interference fringes) in the reflective SLM 121.

The light modulating device and laser processing device in accordance with the present invention can be modified in various ways without being restricted to the above-mentioned embodiments. For example, the light modulating device in accordance with the present invention can also be used for various purposes other than laser processing.

Sixth Embodiment

Figure 14:
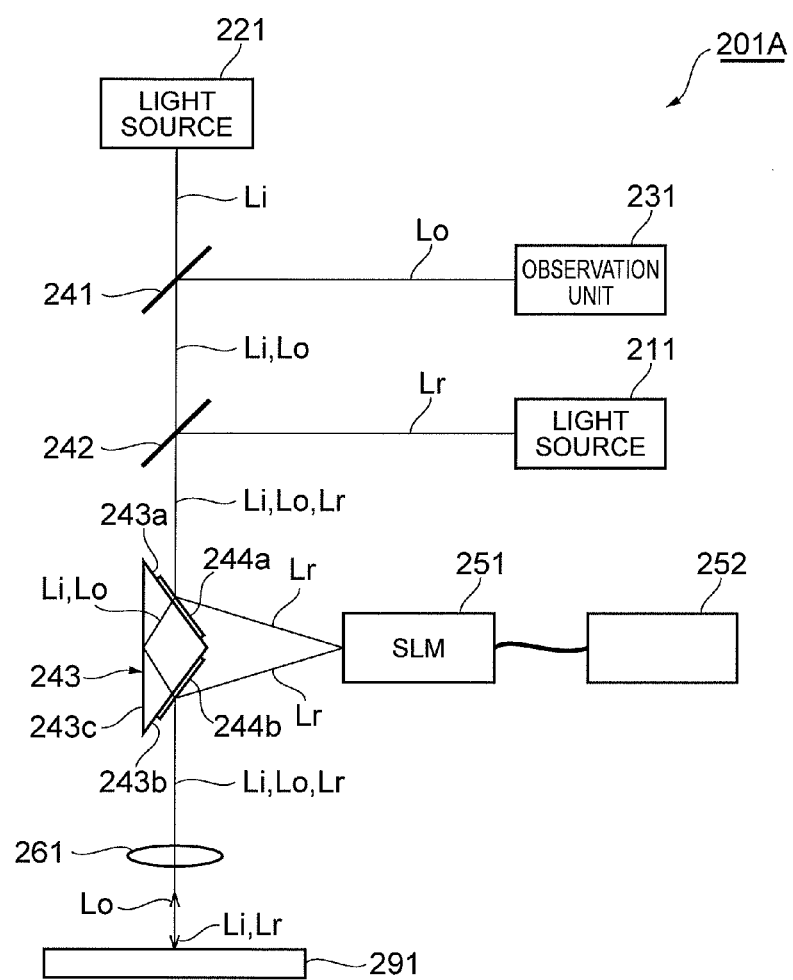
FIG. 14 is a structural diagram of a light modulating device 201A in accordance with a sixth embodiment.

The light modulating device in accordance with the sixth embodiment of the present invention will now be explained. FIG. 14 is a structural diagram of the light modulating device 201A in accordance with the sixth embodiment. The light modulating device 201A illustrated in this drawing comprises light sources 211, 221, an observation unit 231, a half mirror 241, a dichroic mirror 242, a prism 243, a reflective SLM 251, a driving unit 252, and a light collecting lens 261.

The light sources 211, 221 and dichroic mirror 242 constitute a light source unit in this embodiment. The light source 211 is a laser light source for emitting a laser beam Lr which is a beam to be modulated. The light source 221 is an illumination light source for emitting illumination light Li. For example, a halogen lamp is used as the light source 221. The dichroic mirror 242 selectively reflects a specific wavelength of light and transmits therethrough the other wavelengths of light. That is, the dichroic mirror 242 reflects the laser beam Lr arriving from the light source 211 and transmits therethrough the illumination light Li arriving from the illumination light source 221. The dichroic mirror 242 emits the laser beam Lr and illumination light Li having respective wavelengths different from each other onto the same optical path to the prism 243.

The prism 243, which is the first light transmitting member in this embodiment, is made of a light transmitting material transparent to at least the illumination light Li. The prism 243 is formed into a pentahedron with a triangular cross section and has a first surface 243a including one side of the triangle, a second surface 243b including another side, and a third surface 243c including the remaining one side. All of the surfaces 243a to 243c are parallel to the thickness direction of the prism 243 (i.e., the direction perpendicular to the paper surface). The first surface 243a is formed with a dielectric multilayer film mirror (first dielectric multilayer film mirror) 244a adapted to reflect the laser beam Lr and transmit the illumination light Li therethrough. Similarly, the second surface 243b is formed with a dielectric multilayer film mirror (second dielectric multilayer film mirror) 244b adapted to reflect the laser beam Lr and transmit the illumination light Li therethrough.

The dielectric multilayer film mirror 244a reflects the laser beam Lr arriving from the dichroic mirror 242 to the reflective SLM 251, while transmitting therethrough the illumination light Li. The dielectric multilayer film mirror 244b reflects the laser beam Lr arriving from the reflective SLM 251 to the light collecting lens 261, while transmitting therethrough the illumination light Li received from the dielectric multilayer film mirror 244a through the prism 243 onto the same optical path as with the reflected laser beam Lr.

The illumination light Li entering the prism 243 from the first surface 243a through the dielectric multilayer film mirror 244a is totally reflected by the third surface 243c, so as to propagate through the prism 243, thereby reaching the dielectric multilayer film mirror 244b on the second surface 243b.

The reflective SLM 251 receives obliquely in front thereof the laser beam Lr reflected by the dielectric multilayer film mirror 244a and modulates the laser beam Lr for each of a plurality of two-dimensionally arranged pixels while reflecting the laser beam Lr. The reflective SLM 251 of this embodiment is of a phase modulation type and has a structure which will be explained in the following, for example.

Figure 15:
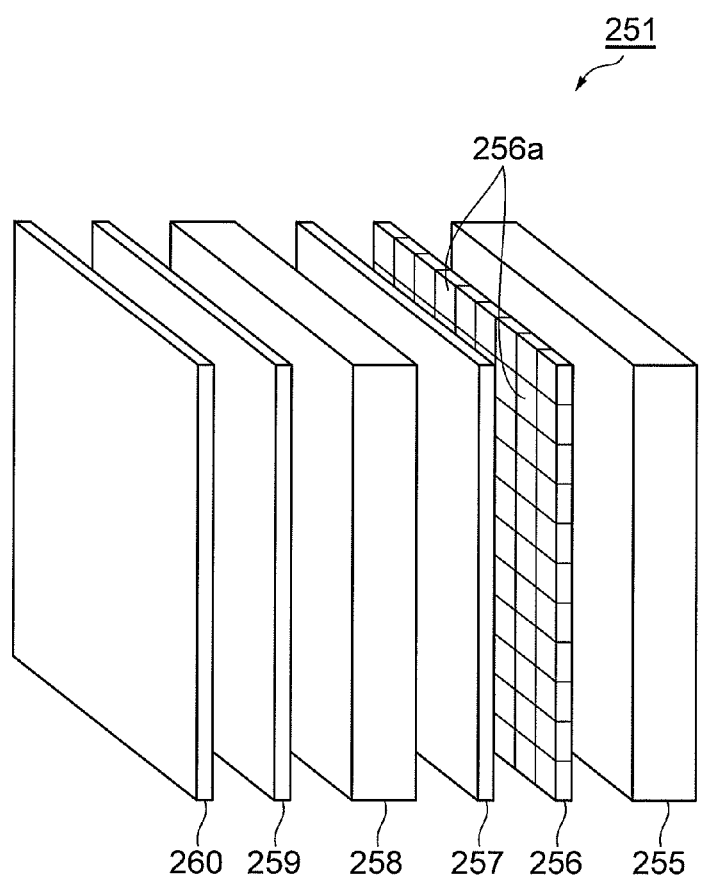
FIG. 15 is an exploded perspective view illustrating an LCOS type structure as an example of a reflective SLM 251.

FIG. 15 is an exploded perspective view illustrating an LCOS (Liquid Crystal on Silicon) type structure as an example of the reflective SLM 251. As illustrated in FIG. 15, the reflective SLM 251 has a silicon substrate 255, a plurality of pixel electrodes 256 disposed on the silicon substrate 255, a mirror layer 257 disposed on the pixel electrodes 256, an undepicted substrate provided with an alignment film and disposed on the mirror layer 257, a glass sheet 260, a transparent electrode 259 attached to the glass sheet 260, and an undepicted substrate equipped with an alignment film and disposed on the transparent electrode 259, while a liquid crystal layer 258 is arranged between the alignment films (between the pixel electrode 256 and transparent electrode 259 in the drawing). The pixel electrode 256 has a plurality of electrode units 256a arranged in a two-dimensional matrix constituted by a plurality of rows and a plurality of columns, while each pixel electrode unit 256a of the pixel electrode 256 opposes the transparent electrode 259 in the laminating direction of the reflective SLM 251.

In thus constructed reflective SLM 251, the laser beam Lr passes through the glass sheet 260 and transparent electrode 259 in sequence from the outside, so as to enter the liquid crystal layer 258, and is reflected by the mirror layer 257, so as to pass through the liquid crystal layer 258, transparent electrode 259, and glass sheet 260 in sequence, thereby exiting to the outside. Here, a voltage is applied between the transparent electrode 259 and each of the pixel electrode units 256a opposing thereto, whereby the refractive index in a part held between a pair of electrode units 256a, 259 opposing each other in the liquid crystal layer 258 changes according to the voltage in the pixel electrode unit. This generates a shift in the phase of a component in a predetermined direction orthogonal to the advancing direction of the laser beam Lr in each of the plurality of pixels, thereby shaping (phase-modulating) the laser beam Lr for each pixel.

Referring to FIG. 14 again, the driving unit 252 sets the amount of phase modulation for each of the plurality of two-dimensionally arranged pixels in the reflective SLM 251 and supplies the reflective SLM 251 with a signal for setting the amount of phase modulation for each pixel.

The light collecting lens 261 is disposed on the optical path of the laser beam Lr and illumination light Li emitted from the dielectric multilayer film mirror 244b. The light collecting lens 261 converges the laser beam Lr reflected by the dielectric multilayer film mirror 244b after being outputted from the reflective SLM 251 and the illumination light Li transmitted through the dielectric multilayer film mirror 244b and focuses the laser beam Lr at a subject site (site to be processed or observed) of an object 291. The light collecting lens 261 inputs therein light (i.e., observation light Lo) generated from the illumination light Li when the latter is reflected or scattered by the object 291, and outputs the observation light Lo to the prism 243. As the light collecting lens 261, an afocal objective lens is used favorably.

The observation light Lo includes the same wavelength component as with the illumination light Li and thus passes through the dielectric multilayer film mirror 244b after reaching there, so as to propagate through the prism 243. The observation light Lo is reflected by the third surface 243c of the prism 243 and then transmitted through the dielectric multilayer film mirror 244a and dichroic mirror 242 in sequence.

The half mirror 241 is disposed between the light source 221 and dichroic mirror 242. The half mirror 241 transmits therethrough the illumination light Li emitted from the light source 221 to the dichroic mirror 242 and reflects the observation light Lo arriving through the dichroic mirror 242 to the observation unit 231. The observation unit 231 receives the observation light Lo arriving from the half mirror 241 with an imaging device and acquires an image of the subject site of the object 291 according to the observation light Lo.

Figure 16:
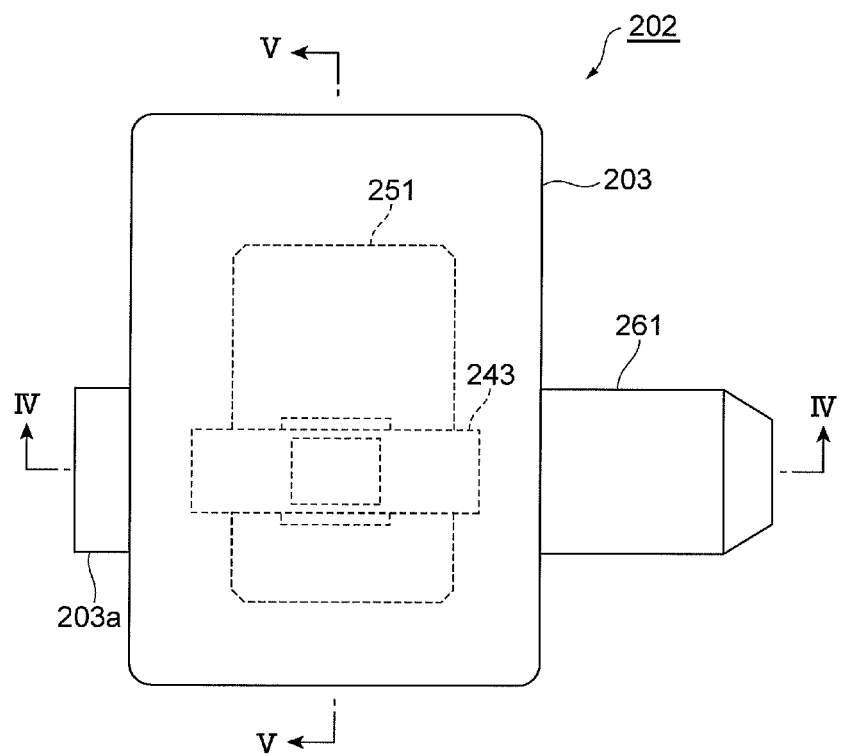
FIG. 16 is a plan view of an SLM module 202 having a prism 243, the reflective SLM 251, and a light collecting lens 261.
Figure 17:
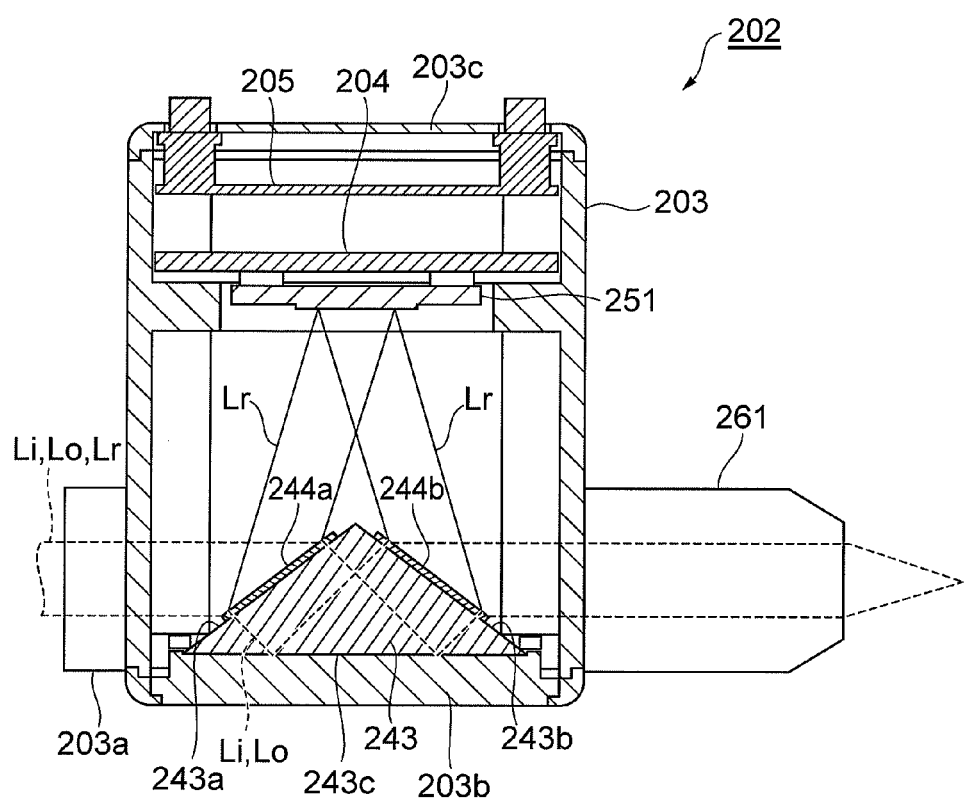
FIG. 17 is a sectional side elevation illustrating a cross section of the SLM module 202 taken along the line IV-IV of FIG. 16.

A specific structural example of the prism 243, reflective SLM 251, and light collecting lens 261 provided in the light modulating device 201A of this embodiment will now be explained. FIG. 16 is a plan view of an SLM module 202 having the prism 243, reflective SLM 251, and light collecting lens 261. FIG. 17 is a sectional side elevation illustrating a cross section of the SLM module 202 taken along the line IV-IV of FIG. 16, while FIG. 18 is a sectional side elevation illustrating a cross section of the SLM module 202 taken along the line V-V of FIG. 16.

Figure 18:
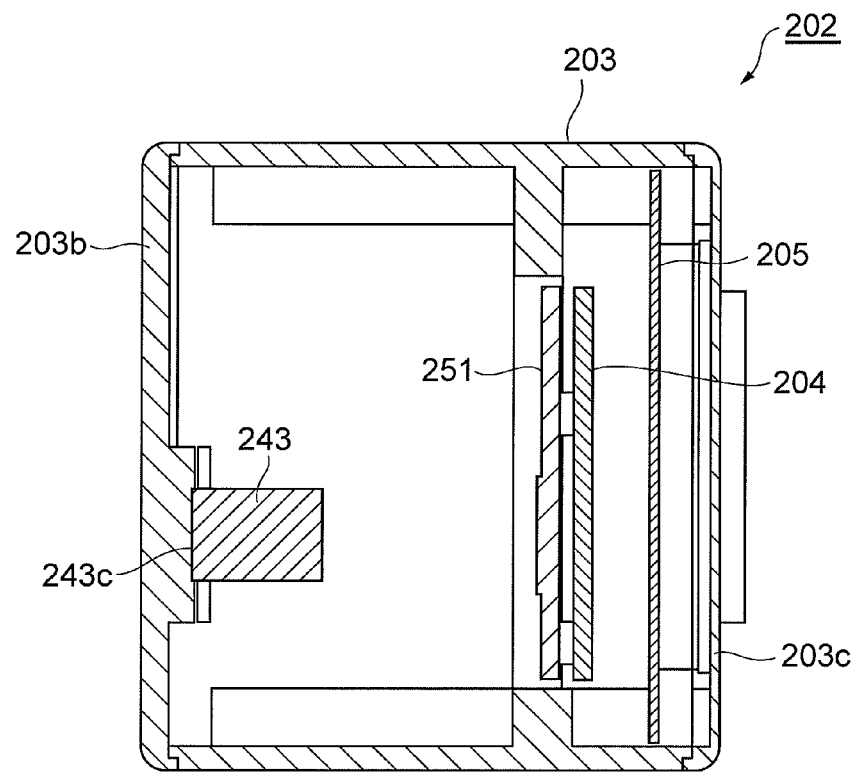
FIG. 18 is a sectional side elevation illustrating a cross section of the SLM module 202 taken along the line V-V of FIG. 16.

Referring to FIGS. 16 to 18, the SLM module 202 comprises a housing 203, the prism 243 and reflective SLM 251 accommodated within the housing 203, and the light collecting lens 261 attached to a wall face of the housing 203. The housing 203 has a substantially rectangular parallelepiped exterior; one of its pair of side walls has the light collecting lens attached thereto, while the other is formed with an aperture 203a. The laser beam Lr and illumination light Li enter the aperture 203a from the light source unit (the light sources 211, 221 and dichroic mirror 242).

The prism 243 is mounted on a bottom plate 203b of the housing 203 such that its thickness direction is orthogonal to an axis connecting the aperture 203a and the light collecting lens 261 to each other. The first and second surfaces 243a, 243b of the prism 243 are arranged such as to face the aperture 203a of the housing 203 and the light collecting lens 261, respectively. The third surface 243c of the prism 243 is disposed on the bottom plate of the housing 203.

The reflective SLM 251 is placed above the prism 243 within the housing 203. The reflective SLM 251 is supported by a tilting mechanism 204. The tilting mechanism 204 is secured to the housing 203 in order to adjust the angle of the reflective SLM 251 and suspends the reflective SLM 251. A circuit board 205 for controlling the reflective SLM 251 is disposed between the tilting mechanism 204 and a top plate 203c of the housing 203.

Operations and effects of the light modulating device 201A having the foregoing structure will now be explained. In the light modulating device 201A in accordance with this embodiment, the laser beam Lr and illumination light Li are fed from the light source unit (the light sources 211, 221 and dichroic mirror 242) onto the same optical path and impinge on the dielectric multilayer film mirror 244a. The dielectric multilayer film mirror 244a separates the laser beam Lr and the illumination light Li from each other, so that only the laser beam Lr impinges on the reflective SLM 251. Thereafter, the dielectric multilayer film mirror 244b causes the laser beam Lr modulated by the reflective SLM 251 and the illumination light Li to take the same optical path again, so as to reach the subject site of the object 291 to be processed or observed. The observation light Lo obtained by reflection or scattering at the subject site travels the optical path in a direction the reverse of the illumination light Li mentioned above and reaches the half mirror 241, so as to be observed by the observation unit 231.

Thus, in the light modulating device 201A in accordance with this embodiment, the illumination light Li and observation light Lo pass through the prism 243, so as not to impinge on the reflective SLM 251. That is, the light modulating device 201A can prevent the illumination light Li and observation light Lo from being modulated by the reflective SLM 251, whereby the subject site can be observed while keeping the resolution and quantity of the observation light Lo entering the observation unit 231.

Using the prism 243 as a light transmitting member formed with the dielectric multilayer film mirrors 244a, 244b and propagating the illumination light Li and observation light Lo through the prism 243 can favorably achieve a structure in which the dielectric multilayer film mirror 244a separates the respective optical paths of the laser beam Lr and illumination light Li from each other while the dielectric multilayer film mirror 244b causes them to take the same optical path again. Such a structure makes it unnecessary to adjust the angles of the dielectric multilayer film mirrors 244a, 244b and the optical path of the illumination light Li passing therethrough, whereby the light modulating device 201A can be assembled easily.

Seventh Embodiment

Figure 19:
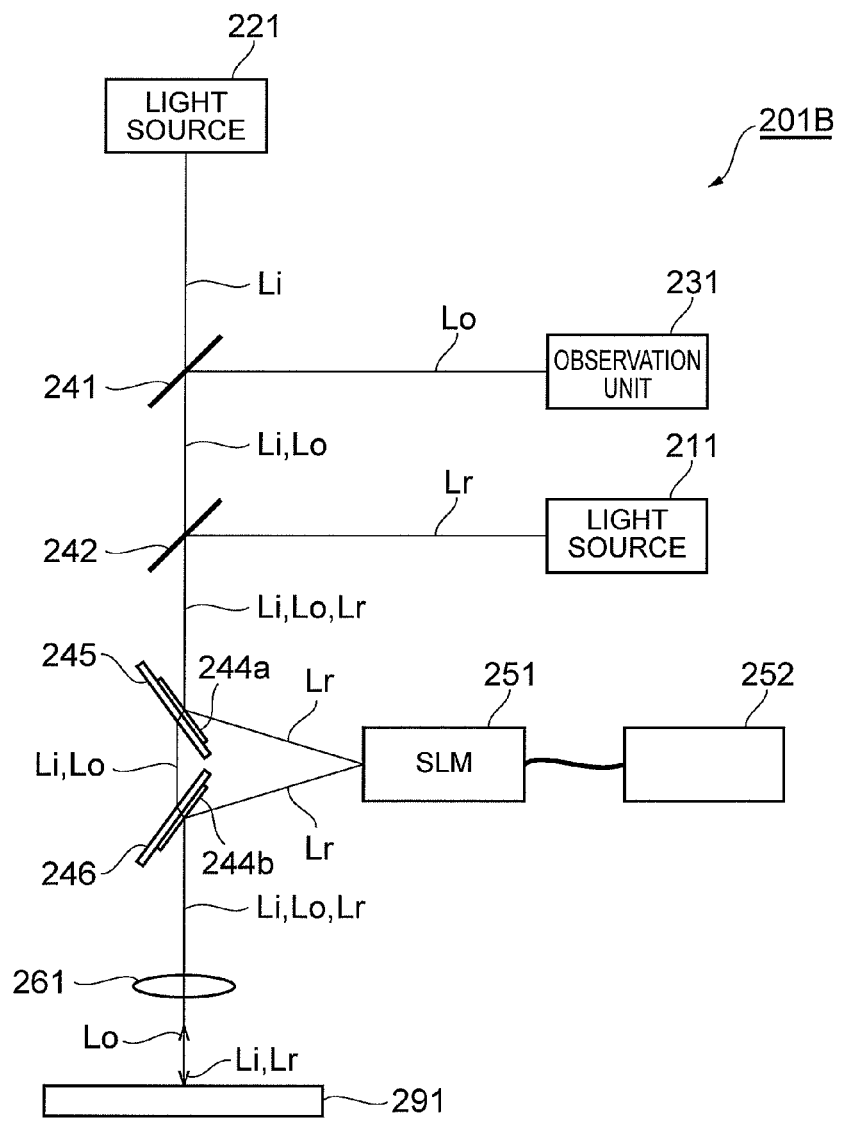
FIG. 19 is a structural diagram of a light modulating device 201B in accordance with a seventh embodiment.

The light modulating device in accordance with the seventh embodiment of the present invention will now be explained. FIG. 19 is a structural diagram of the light modulating device 201B in accordance with the seventh embodiment. The light modulating device 201B illustrated in this drawing structurally differs from the light modulating device 201A of the sixth embodiment in terms of the mode of the light transmitting member formed with the dielectric multilayer film mirrors 244a, 244b. The structures and operations of the other parts (the light sources 211, 221, observation unit 231, half mirror 241, dichroic mirror 242, reflective SLM 251, driving unit 252, and light collecting lens 261) are the same as those in the sixth embodiment mentioned above and thus will not be explained in detail.

As illustrated in FIG. 19, the light modulating device 201B is equipped with a light transmitting plate 245 as the first light transmitting member in this embodiment and a light transmitting plate 246, provided separately from the light transmitting member 245, as the second light transmitting member in this embodiment in place of the prism 243 illustrated in FIG. 14. The light transmitting plates 245, 246 are made of a light transmitting material transparent to at least the illumination light Li. The first dielectric multilayer film mirror 244a is formed on a sheet surface of the light transmitting plate 245, while the second dielectric multilayer film mirror 244b is formed on a sheet surface of the light transmitting plate 246.

As in the sixth embodiment, the dielectric multilayer film mirror 244a reflects the laser beam Lr arriving from the dichroic mirror 242 to the reflective SLM 251, while transmitting the illumination light Li therethrough. The illumination light Li transmitted through the dielectric multilayer film mirror 244a passes through the light transmitting plates 245, 246, so as to reach the dielectric multilayer film mirror 244b. On the other hand, the laser beam Lr impinges on the reflective SLM 251 and is modulated thereby before reaching the dielectric multilayer film mirror 244b. The dielectric multilayer film mirror 244b reflects the laser beam Lr to the light collecting lens 261, while transmitting therethrough the illumination light Li onto the same optical path as with the reflected laser beam Lr.

In the light modulating device 201B having the foregoing structure in accordance with this embodiment, the illumination light Li and observation light Lo pass through a path constituted by the light transmitting plates 245, 246, so as not to impinge on the reflective SLM 251. That is, the light modulating device 201B can also prevent the illumination light Li and observation light Lo from being modulated by the reflective SLM 251, whereby the subject site can be observed while keeping the resolution and quantity of the observation light Lo entering the observation unit 231.

In this embodiment, the dielectric multilayer film mirrors 244a, 244b are formed on the separate light transmitting plates 245, 246, respectively, whereby the illumination light Li transmitted through the dielectric multilayer film mirror 244a propagates to the dielectric multilayer film mirror 244b. Such a configuration can favorably achieve a structure in which the dielectric multilayer film mirror 244a separates the respective optical paths of the laser beam Lr and illumination light Li from each other while the dielectric multilayer film mirror 244b causes them to take the same optical path again.

The light modulating device in accordance with the present invention can be modified in various ways without being restricted to the above-mentioned embodiments. For example, though the sixth embodiment exemplifies a prism as the first light transmitting member, while the seventh embodiment illustrates light transmitting plates as the first and second light transmitting members, the first and second light transmitting members in the present invention are not limited to them but can be constructed by members with various materials and forms which can transmit the illumination light therethrough.

INDUSTRIAL APPLICABILITY

The present invention provides a light modulating device and a laser processing device by which subject sites can be observed while keeping the resolution and quantity of observation light.

The invention claimed is:

1. A light modulating device comprising:
    a light source unit for emitting a laser beam and illumination light having respective wavelengths different from each other onto the same optical path;
    a first dielectric multilayer film mirror, formed on a first light transmitting member transparent to the illumination light, for receiving the laser beam and illumination light emitted onto the same optical path from the light source unit, reflecting the laser beam, and transmitting therethrough the illumination light;
    a reflective spatial light modulator for receiving obliquely in front thereof the laser beam from the first dielectric multilayer film mirror, and modulating the laser beam for each of a plurality of two-dimensionally arranged pixels while reflecting the laser beam;
    a second dielectric multilayer film mirror, formed on the first light transmitting member or a second light transmitting member transparent to the illumination light, provided separately from the first light transmitting member, for reflecting the laser beam received from the spatial light modulator and transmitting therethrough the illumination light transmitted through the first dielectric multilayer film mirror, and transmitted through at least the first light transmitting member, onto the same optical path as with the reflected laser beam; and
    a light collecting lens for receiving the illumination light and laser beam emitted onto the same optical path from the second dielectric multilayer film mirror and converging the illumination light and laser beam,
    wherein the first light transmitting member is constituted by a prism,
    the first dielectric multilayer film mirror is formed on a first surface of the prism,
    the second dielectric multilayer film mirror is formed on a second surface of the prism and
    the illumination light is entered from the first surface and totally reflected at a third surface of the prism, and the illumination light that is totally reflected propagates to the second surface through the prism.

* * * * *